(12) United States Patent
Sakamoto

(10) Patent No.: US 6,839,630 B2
(45) Date of Patent: Jan. 4, 2005

(54) NAVIGATION SYSTEM

(75) Inventor: Kiyomi Sakamoto, Ikoma (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 10/134,787

(22) Filed: Apr. 30, 2002

(65) Prior Publication Data

US 2002/0173908 A1 Nov. 21, 2002

(30) Foreign Application Priority Data

May 15, 2001 (JP) ........................................ 2001-145262

(51) Int. Cl.[7] .............................................. G01C 21/34
(52) U.S. Cl. ...................... 701/211; 701/201; 701/209; 340/990
(58) Field of Search ................................ 701/211, 200, 701/201, 209; 73/178 R; 340/990, 995.4

(56) References Cited

U.S. PATENT DOCUMENTS

| | | | | |
|---|---|---|---|---|
| 5,729,217 A | * | 3/1998 | Ito et al. ..................... 340/988 |
| 5,774,073 A | * | 6/1998 | Maekawa et al. ...... 340/995.21 |
| 5,821,880 A | * | 10/1998 | Morimoto et al. ..... 340/995.21 |
| 6,034,626 A | * | 3/2000 | Maekawa et al. ...... 340/995.21 |
| 6,061,630 A | * | 5/2000 | Walgers et al. ............. 701/210 |
| 6,125,326 A | | 9/2000 | Ohmura et al. |
| 6,127,945 A | * | 10/2000 | Mura-Smith ................. 340/988 |
| 6,321,158 B1 | * | 11/2001 | DeLorme et al. ........... 701/201 |
| 6,427,115 B1 | * | 7/2002 | Sekiyama ................... 701/208 |
| 6,574,552 B2 | * | 6/2003 | Yano et al. ................. 701/209 |

FOREIGN PATENT DOCUMENTS

JP      10-103999      4/1998

* cited by examiner

Primary Examiner—Thomas G. Black
Assistant Examiner—Olga Hernandez
(74) Attorney, Agent, or Firm—Wenderoth, Lind & Ponack, L.L.P.

(57) ABSTRACT

In a main device, a processor receives information about a destination point, and further generates guide image data representing a guide image for guiding a user who is driving a vehicle. A display unit displays the guide image generated by the processor, thereby guiding the driving user to the destination point. When it is determined, while guiding the driving user, that the user is going to get off the vehicle, the processor generates navigation data Dnvg including the information about the destination point, and transfers the navigation data to a sub-device. In the sub-device, a processor generates, based on the received navigation data Dnvg, guide image data for outside of the vehicle representing a guide image for guiding the user who is traveling to the destination point on foot. A display unit displays the guide image generated by the processor. Thus, it is possible to provide a navigation system that is convenient to use.

15 Claims, 21 Drawing Sheets

F I G. 5
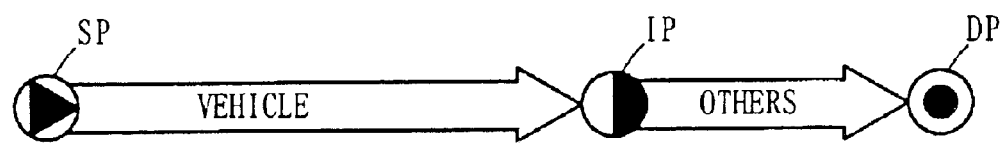

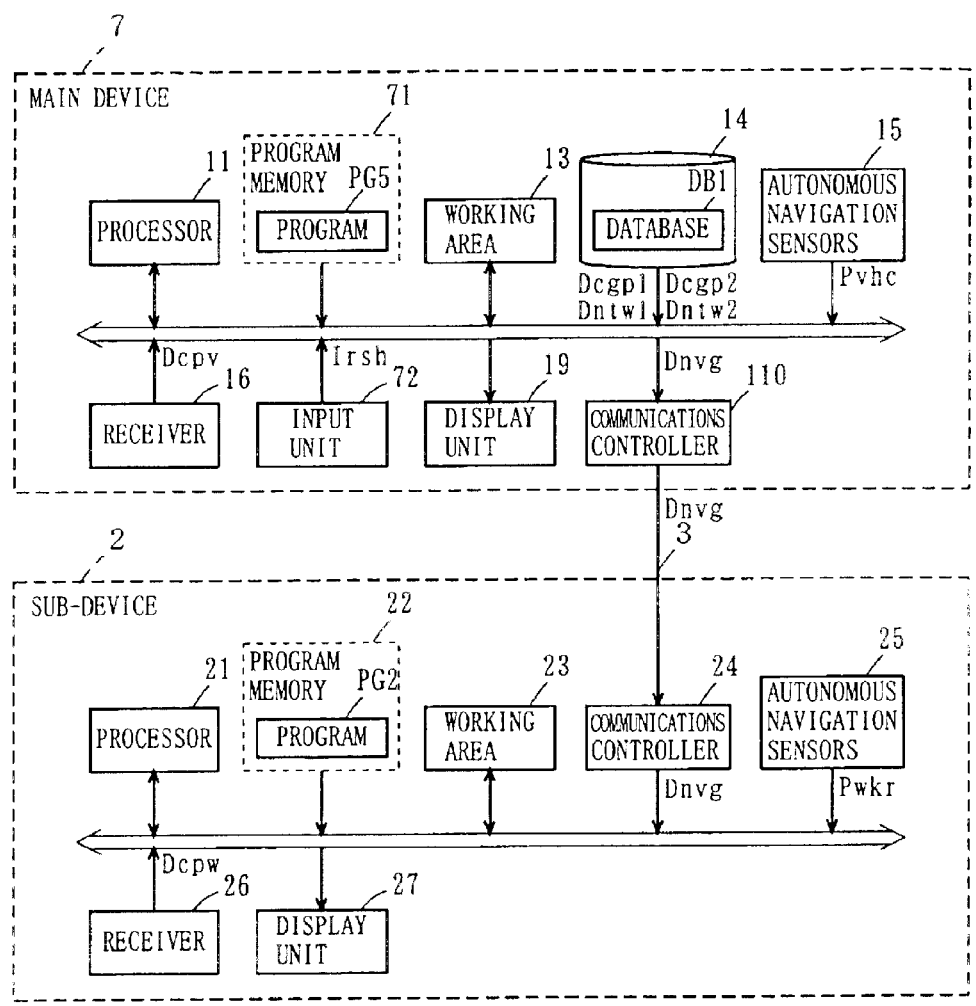
F I G. 2 1

NAVIGATION SYSTEM

BACKGROUND OF THE INVENTION

1. Field of the Invention

The present invention relates to navigation systems and, more specifically, to a navigation system constructed by a main device for carrying out navigation for a vehicle, and a sub-device for carrying out navigation for outside of the vehicle.

2. Description of the Background Art

An example of the above described navigation system is disclosed in U.S. Pat. No. 6,125,326 (and its corresponding Japanese Patent Laid-Open Publication No. 10-103999 (1998-103999)). Such conventional navigation system is constructed by a main device fixedly incorporated in a vehicle and a sub-device removably mounted on the vehicle. When mounted on the vehicle, the sub-device displays cartographic information and current position information on a main display under the control of a control unit. Before removed, the sub-device receives, from the control unit, a transfer of cartographic information about a predetermined area surrounding the current position of the vehicle. After removed, the sub-device displays a map based on the cartographic information transferred from the control unit and the current position of the user traveling outside of the vehicle.

However, the conventional navigation system is not so convenient for users to use. To describe this more specifically, consider a case where a user goes from a starting point by vehicle, gets off the vehicle at some point, and then goes to a destination point on foot. In this case, the user first uses the main device while driving the vehicle, and then uses the sub-device after getting off the vehicle. In the conventional navigation system, however, as described above, only the cartographic data for the surrounding area has been transferred to the sub-device. Consequently, the user has to further input information about the destination point in the sub-device for receiving route guidance, which is quite burdensome.

SUMMARY OF THE INVENTION

Therefore, an object of the present invention is to provide a navigation system that is more convenient to use than ever before.

The present invention has the following features to attain the object mentioned above.

A first aspect of the present invention is directed to a navigation system for guiding a user from a starting point to a destination point. The navigation system includes: a main device fixed to a vehicle; and a sub-device capable of communicating with the main device and being held by the user. Here, the main device includes a receiving unit for receiving at least information of the destination point; a first generating unit for generating guide image data for vehicle representing a guide image for guiding the vehicle; a first displaying unit for displaying the guide image represented by the guide image data for the vehicle generated by the first generating unit; a determining unit for determining whether the user gets off the vehicle; and a generating/transferring unit for generating, when the determining unit determines that the user gets off the vehicle, navigation data including at least the destination point received by the receiving unit, and transferring the navigation data to the sub-device. The sub-device includes a second generating unit for generating guide image data for vehicle representing a guide image for guiding the user traveling outside of the vehicle based on the navigation data transferred from the generating/transferring unit; and a second display unit for displaying the guide image represented by the guide image data according to the guide image data outside of the vehicle generated by the second generating unit.

In the first aspect, the main device guides the vehicle from the starting point to the destination point, and the sub-device guides the user traveling outside of the vehicle from the point where the user gets off the vehicle to the destination point. Here, the main device automatically transfers the navigation data including information about the destination point to the sub-device. Based on the received navigation data, the sub-device generates guide image data for outside of the vehicle representing a guide image for guiding the user traveling outside of the vehicle to the destination point. As such, the user can see the guide image presented on the sub-device until he or she arrives at the destination point without re-inputting the information about the destination point to the sub-device. Therefore, it is possible to provide a navigation system that is more convenient to use than ever before.

A second aspect of the present invention is directed to a navigation device fixed to a vehicle and capable of communicating with another navigation device portable by a user. The navigation device for guiding the user from a starting point to a destination point includes a receiving unit for receiving at least information about the destination point; a generating unit for generating vehicle guide image data representing a guide image for guiding the vehicle; a displaying unit for displaying the guide image represented by the guide image data for the vehicle generated by the generating unit; a determining unit for determining whether the user gets off the vehicle; and a generating/transferring unit for generating, when the determining unit determines that the user gets off the vehicle, navigation data including at least the destination point received by the receiving unit, and transferring the navigation data to the sub-device. Here, the other navigation device generates guide image data for outside of the vehicle representing a guide image for guiding the user traveling outside of the vehicle based on the navigation data transferred from the generating/transferring unit, and displays the guide image.

A third aspect of the present invention is directed to a navigation device portable by a user and capable of communicating with another navigation device fixed to a vehicle. The navigation device for guiding the user to a destination point includes a receiving unit for receiving navigation data from the other navigation device, the navigation data including at least the destination point; a generating unit for generating guide image data for outside of the vehicle representing a guide image for guiding the user traveling outside of the vehicle to the destination point based on the navigation data received by the receiving unit; and a displaying unit for displaying the guide image represented by the guide image data for outside of the vehicle generated by the generating unit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic illustration for demonstrating how a user travels under the navigation system NS1 shown in FIG. 1;

FIG. 21 is a block diagram showing the detailed construction of a main device 7 and a sub-device 2 shown in FIG. 20;

DESCRIPTION OF THE PREFERRED EMBODIMENTS

Figure 1A:
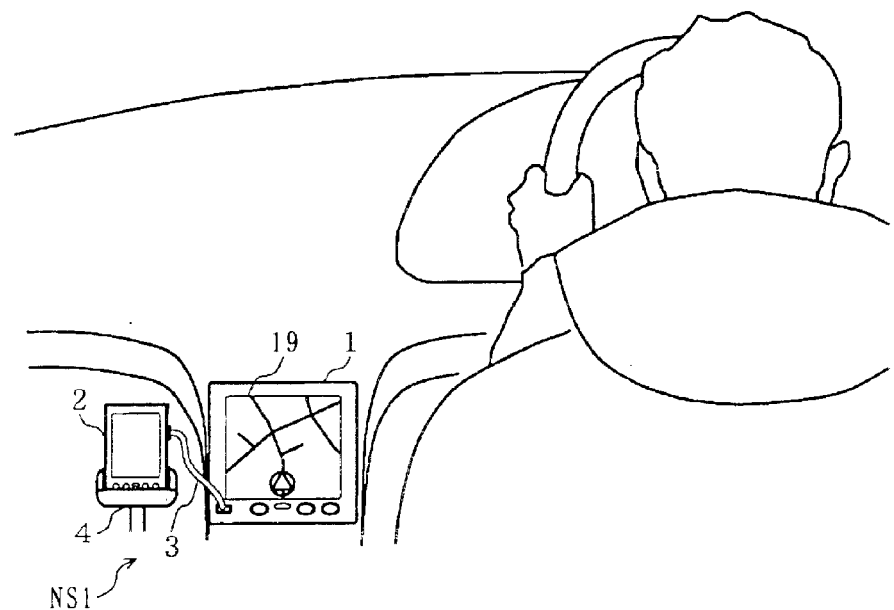
FIGS. 1A and 1B are illustrations showing the overall construction of a navigation system NS1 according to one preferred embodiment of the present invention.
Figure 1B:
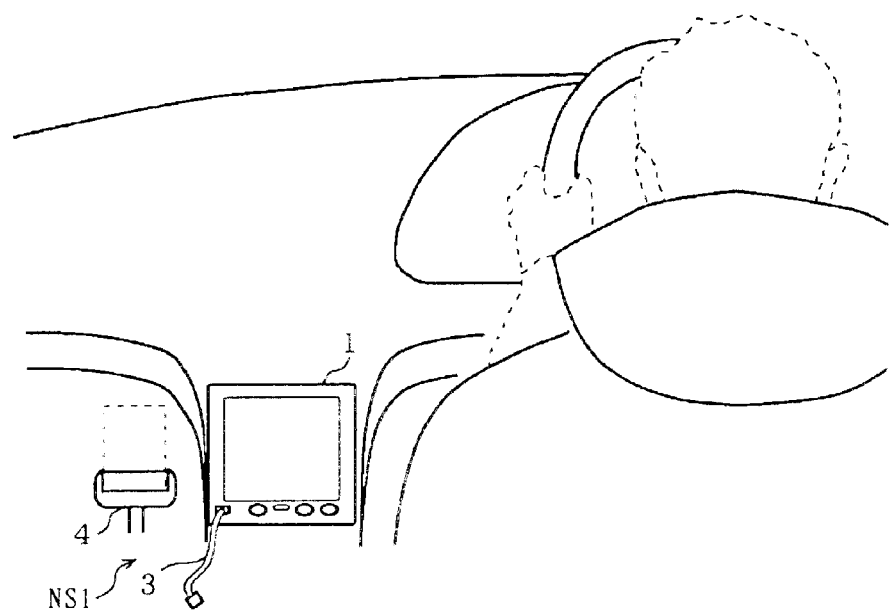

FIG. 1A is an illustration showing the overall construction of a navigation system NS1 according to a first embodiment of the present invention. In FIG. 1A, the navigation system NS1 is so constructed as to be mountable on a vehicle, the system including a main device 1, a sub-device 2, a cable 3, and a holder 4. The main device 1 has a display unit 19 fixed to a position viewable by a driver's seat for navigating (directing) a user who is driving the vehicle. The sub-device 2 is so constructed as to be portable for navigating (directing) a user who is traveling outside of the vehicle. Hereinafter, navigation carried out by the main device 1 is referred to as vehicle navigation, and navigation by the sub-device 2 is referred to as off-vehicle navigation. The cable 3 connects the main device 1 and the sub-device 2 together so as to enable data communications therebetween. The holder 4 is fixed to the vehicle for removably holding the sub-device 2. Specifically, as illustrated in FIG. 1A, the sub-device 2 is mounted on the holder 4 while the user is driving. When the user gets off the vehicle, as illustrated in FIG. 1B, the sub-device 2 is removed from the holder 4, and taken with the user.

Figure 2:
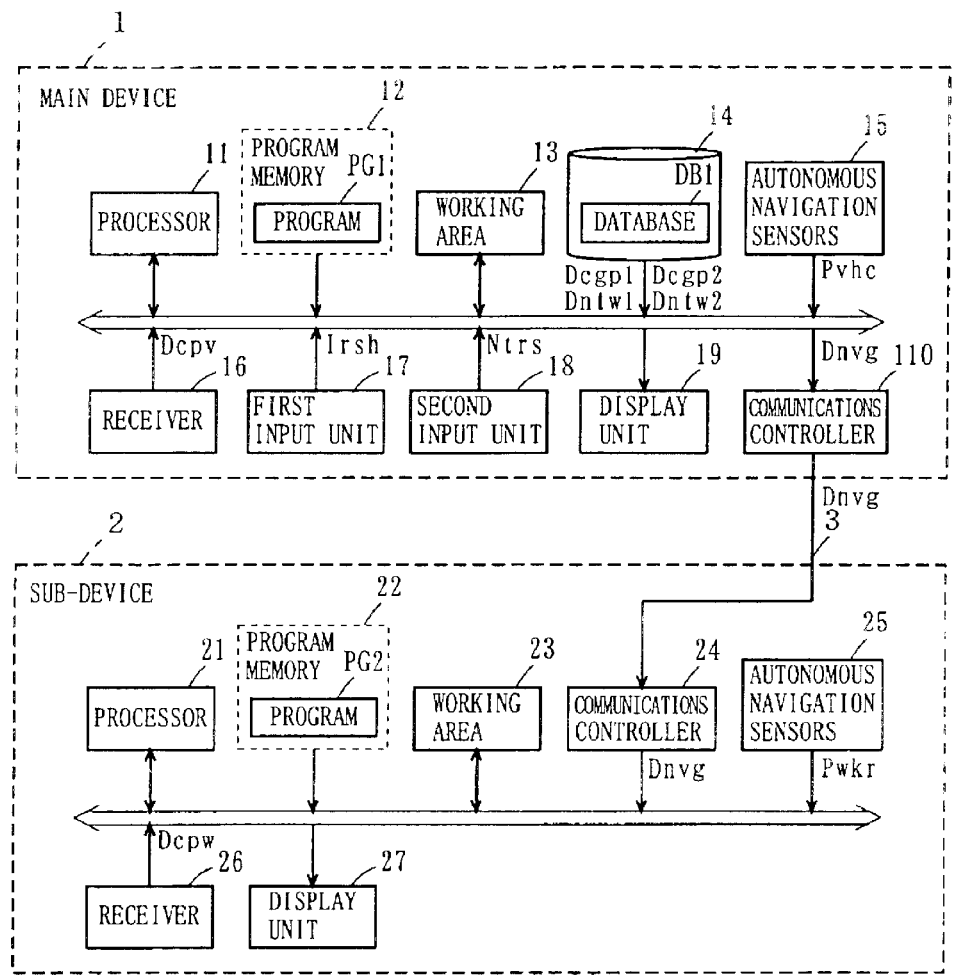
FIG. 2 is a block diagram showing the detailed construction of a main device 1 and a sub-device 2 shown in FIG. 1.

With reference to FIG. 2, described next is the detailed construction of the main device 1 and the sub-device 2 shown in FIG. 1A. As illustrated in FIG. 2, the main device 1 includes a processor 11 communicably connected to program memory 12, a working area 13, a storage unit 14, autonomous navigation sensors 15, a receiver 16, a first input unit 17, a second input unit 18, the display unit 19, and a communications controller 110. The processor 11 executes a computer program (hereinafter simply referred to as a program) PG1 previously stored in the program memory 2 for carrying out processing required for vehicle navigation while using the working area 13.

Figure 3:
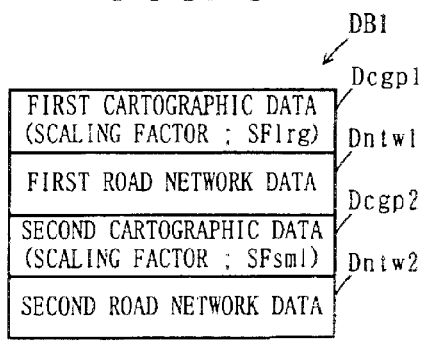
FIG. 3 is an illustration showing the detailed structure of a database DB1 shown in FIG. 1.
Figure 4A:
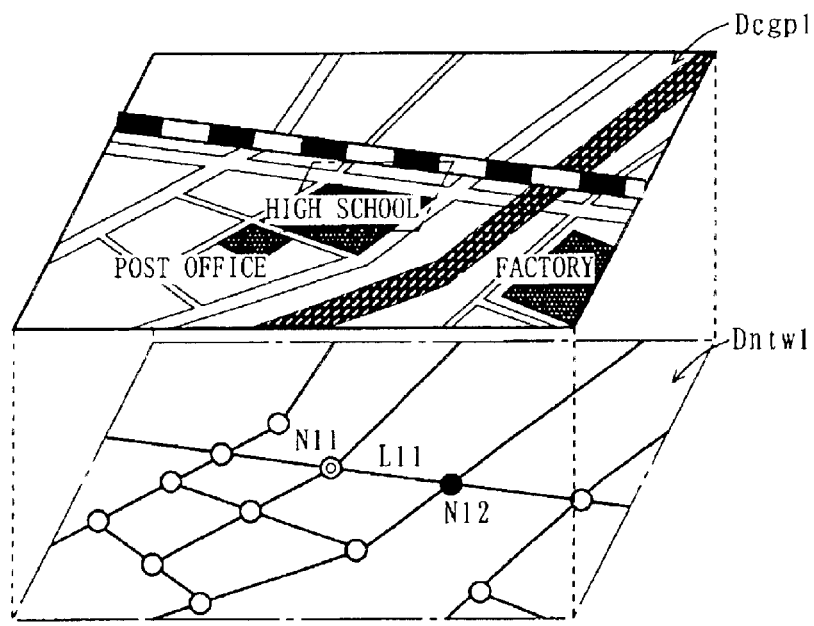
FIG. 4A is a schematic illustration showing a map and a road network represented by first cartographic data Dcgp1 and first road network data Dntw1, respectively, both shown in FIG. 3.

The storage unit 14 stores a database DB1. The database DB1 is, as illustrated in FIG. 3, a set of first cartographic data Dcgp1, first road network data Dntw1, second cartographic data Dcgp2, and second road network data Dntw2. The first cartographic data Dcgp1 and the first road network data Dntw1 are used for vehicle navigation. The first cartographic data Dcgp1 represents a map covering a predetermined wide area (hereinafter referred to as a basic area), such as the entire Japan, scaled down by a predetermined scaling factor SFlrg for showing the state on the ground surface. Illustrated in FIG. 4A is a portion of the map covering the basic area represented by the first cartographic data Dcgp1. The first road network data Dntw1 uses nodes and links to represent the connecting relation among roads of a road network on the map represented by the first cartographic data Dcgp1. FIG. 4A also schematically illustrates these nodes and links represented by the first road network data Dntw1. Exemplarily illustrated in FIG. 4A are a node N11 denoted as a double circle, a node N12 denoted as a black circle, and a link L11 connecting these two nodes N11 and N12 together.

Figure 4B:
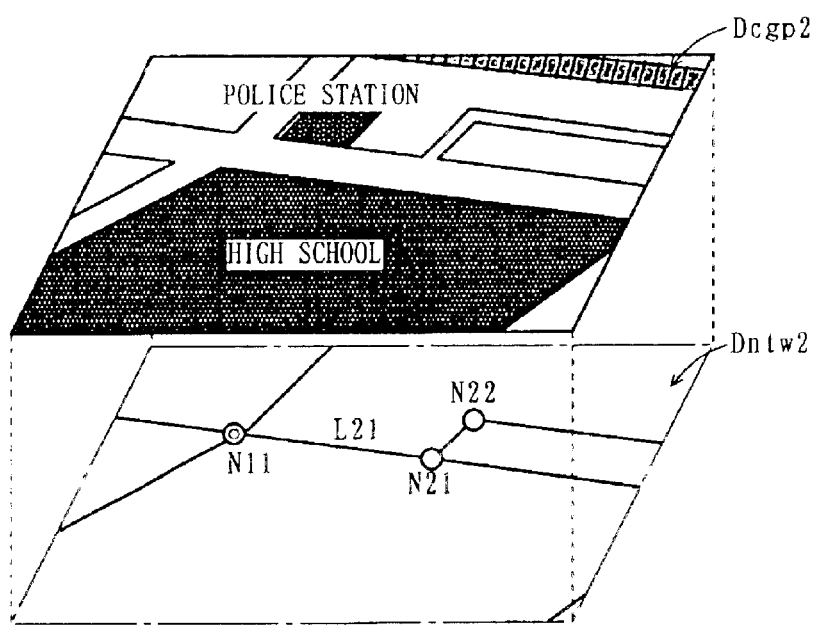
FIG. 4B is a schematic illustration showing a map and a road network represented by second cartographic data Dcgp2 and second road network data Dntw2, respectively, both shown in FIG. 3.

The second cartographic data Dcgp2 and the second road network data Dntw2 illustrated in FIG. 3 are used for off-vehicle navigation. The second cartographic data Dcgp2 represents the map covering the basic area scaled down by a scaling factor SFsm1 smaller than the scaling factor SFlrg, showing the state on the ground surface of the basic area. The scaling factor SFsm1 is smaller than the scaling factor SFlrg because the user traveling outside the vehicle generally moves, per unit of time, within an area smaller than that within which the vehicle moves. Here, illustrated in FIG. 4B is a portion of a map of the basic area represented by the second cartographic data Dcgp2, more specifically, an area surrounded by a chain double-dashed line in the map illustrated in FIG. 4A. As clear from comparison between FIG. 4A and FIG. 4B, the map represented by the second cartographic data Dcgp2 is more detailed than that represented by the first cartographic data Dcgp1 because the scaling factor SFsm1 is smaller than the scaling factor SFlrg. Therefore, narrow roads through which vehicle cannot pass, such as sideways, can be represented on the map. The second road network data Dntw2 uses nodes and links to represent the connecting relation among roads of a road network on the map represented by the second cartographic data Dcgp2. FIG. 4B also schematically illustrates these nodes and links represented by the second road network data Dntw2. Exemplarily illustrated in FIG. 4B are the node N11 as illustrated in FIG. 4A, a node N21, a node N22, and a link L21 connecting the two nodes N12 and N22 to each other.

The autonomous navigation sensors 15 illustrated in FIG. 2 typically include an azimuth sensor and a vehicle-speed sensor both mounted on the vehicle for detecting the direction of travel and the speed of the vehicle and transmitting the detection results to the processor 11 as vehicle parameters Pvhc. The autonomous navigation sensors 15 may not be restricted to the azimuth sensor and the vehicle-speed sensor, and may include any unit as long as it can detect parameters unique to the vehicle for achieving autonomous navigation. Here, the autonomous navigation is such navigation as that the processor 11 derives the current position of the vehicle from the results detected by a sensor in the vehicle.

The receiver 16 is typically implemented by a GPS (Global Positioning System) receiver, calculating the current position of the vehicle based on information transmitted from an artificial satellite and sending the calculation results to the processor 11 as vehicle's positional data Dcpv. The receiver 16 may not be restricted to a GPS receiver, and may be any unit as long as it can calculate the current position of the vehicle for achieving heteronomous navigation. Here, the heteronomous navigation is the opposite of the autonomous navigation, meaning that the processor 11 derives the current position of the vehicle from information supplied by a positioning system.

The first and second input units 17 and 18 are the same in that both are operated by the user, but different in function. The first input unit 7 is operated when the user desires to carry out route search in vehicle navigation. In response to the operation, the first input unit 17 generates a search start instruction Irsh for transmission to the processor 11. The route search instruction Irsh is a signal for instructing the processor 11 to start route search. After the route search is started, the user also operates the first input unit 17 to input the starting point SP and the destination point DP (refer to FIG. 5) to the main device 1.

Furthermore, the user operates the second input unit 18 immediately before getting off the vehicle. In response to this operation, the second input unit 18 generates timing notification Ntrs for transmission to the processor 11. The timing notification Ntrs is a signal for notifying the processor 11 of timing of change from vehicle navigation to off-vehicle navigation.

The display unit 19 is typically a liquid crystal display. The communications controller 110 transmits navigation data Dnvg (refer to FIG. 10) generated by the processor 11 to the communications control unit 24 of the sub-device 2 via the cable 3.

As illustrated in FIG. 2, the sub-device 2 includes a processor 21 communicably connected to program memory 22, a working area 23, a communications controller 24, autonomous navigation sensors 25, a receiver 26, and a display unit 27. The processor 21 executes a computer program (hereinafter simply referred to as a program) PG2 stored in the program memory 22 for carrying out processing required for off-vehicle navigation by using the working area 23. The communications controller 24 receives the navigation data Dnvg transmitted from the communications controller 110 of the main device 2 via the cable 3, and stores the received navigation data Dnvg in the working area 23. The autonomous navigation sensors 25 typically include an azimuth sensor and a pedometer for detecting the direction of travel and the number of steps taken by the user and transmitting the detection results as travel parameters Pwkr to the processor 21. The receiver 26 is similar in operation to the receiver 16, generating positional data Dcpw indicating the current position of the user and transmitting the positional data Dcpw to the processor 21. Here, as with the receiver 16, the receiver 26 may be a GPS receiver, or may be a PHS (Personal Handy-phone System) receiver. In the latter case, the user of the sub-device 2 has to sign up a position detecting service provided by a PHS provider in order to receive information for specifying the position of the sub-device 2 from a PHS base station. The display unit 27 is typically a liquid crystal display.

As illustrated in FIG. 5, when the user travels from the starting point SP to the destination point DP, the user may first go to a place somewhere between the starting point SP and the destination point DP (the place is hereinafter referred to as an intermediate point IP) by vehicle, and then go to the destination point DP by means other than the vehicle (on foot, for example). For example, when the user goes from home to a restaurant, he or she uses a vehicle to go to a parking lot near the restaurant (the parking lot corresponds to the intermediate point IP), gets off the vehicle at the parking lot, and then goes to the restaurant by another means. As such, the navigation system NS1 is suitable for the user who travels from the starting point SP to the destination point DP by vehicle and then by another means. Here, such another means is not restricted to on foot, but may be public transportation, plane, ship, or any combination thereof.

Figure 6:
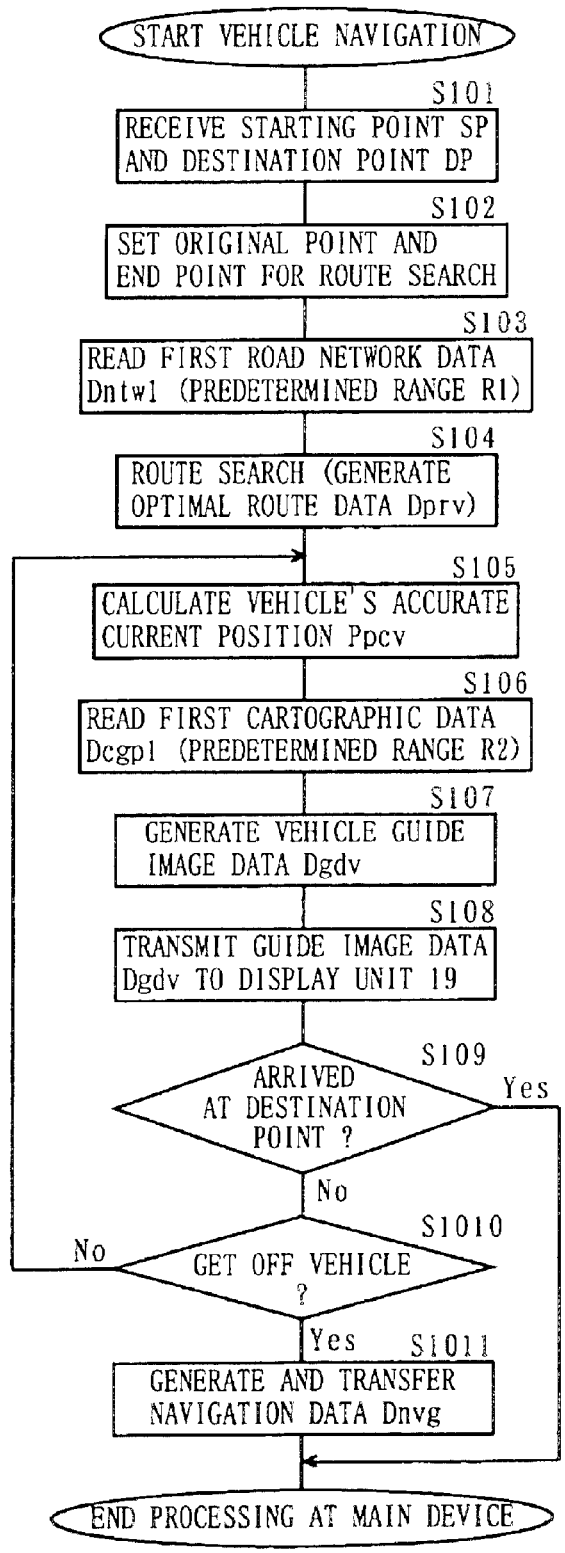
FIG. 6 is a flowchart showing the procedure carried out by a processor 11 shown in FIG. 2.
Figure 7:
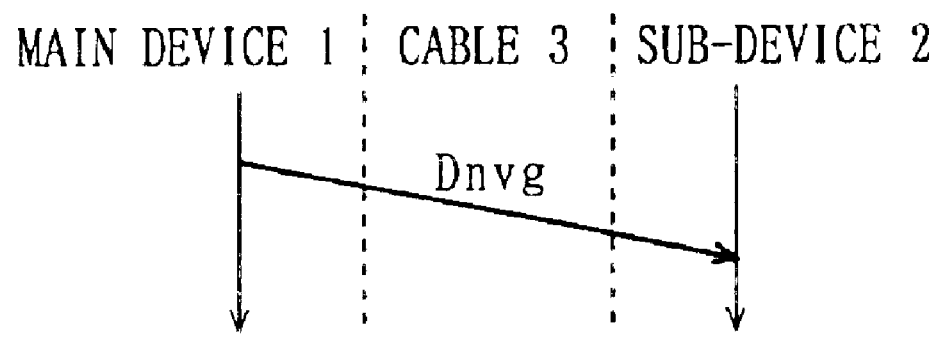
FIG. 7 is a sequence chart showing communications from the main device 1 to the sub-device 2 of FIG. 2.
Figure 8:
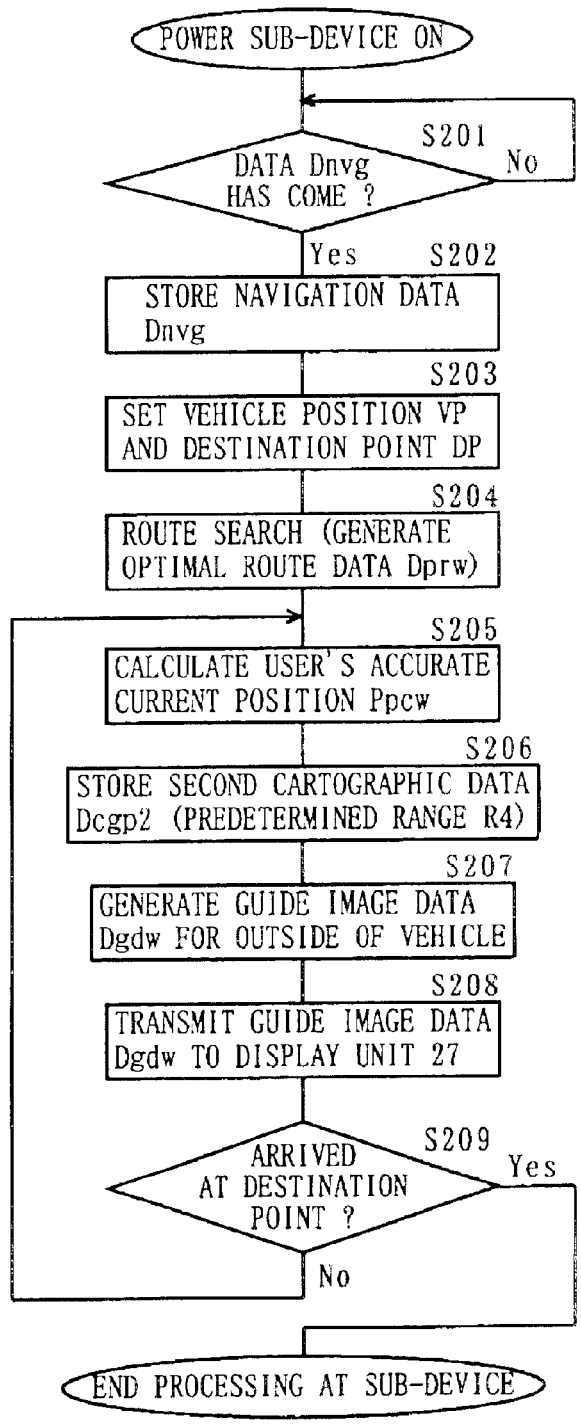
FIG. 8 is a flowchart showing the procedure carried out by a processor 21 shown in FIG. 2.

With reference to FIGS. 6 to 8, described next is the operation of the navigation system NS1 in a case where the user travels as illustrated in FIG. 5. The user first starts the operation of the vehicle. At this time, the main device 1 and the sub-device 2 are supplied with drive power. Then, the processor 11 of the main device 1 starts executing the program PG1. The processor 21 of the sub-device 2 starts executing the program PG2. Alternatively, the sub-device 2 may be supplied with drive power immediately before use.

First, the user operates the first input unit 17 of the main device 1. In response to the operation, the first input unit 17 transmits the above described search start instruction Irsh to the processor 11. In response to the search start instruction Irsh, the processor 11 carries out the vehicle navigation whose procedure has been described in the program PG1. FIG. 6 is a flowchart showing the procedure of vehicle navigation. In FIG. 6, the processor 11 first receives the starting point SP and the destination point DP (step S101), and stores them in the working area 13 for setting an original point and an end point of route search carried out in the following step S104 (step S102). More specifically, in step S101, the user operates the first input unit 17 for designating the starting point SP and the destination point DP. The processor 11 receives the designated starting point and destination point DP. The starting point SP and the destination point DP stored in the working area 13 are both represented by, for example, a longitude coordinate and a latitude coordinate. In the following description, the longitude and latitude coordinates of the starting point SP are collectively referred to as a coordinate value Csp, and those of the destination point DP are as a coordinate value Cdp.

The processor 11 then accesses the database DB1 for reading data representing a portion covering a predetermined range R1 from the first road network data Dntw1 into the working area 13 (step S103). Here, the predetermined range R1 is a range assumed to include an optimal route from the starting point SP to the destination point DP set in step S102, generally the range surrounded by a rectangle including both of the points SP and DP.

The processor 11 then uses a scheme typified by the Dijkstra's algorithm for deriving the optimal route from the starting point SP to the destination point DP from the first road network data Dntw1 read in step S103 and generating optimal route data Dprv for the vehicle on the working area 13 (step S104). The optimal route data Dprv is a sting of nodes (or links) representing the optimal route obtained in step S104.

The processor 11 then receives the vehicle parameters Pvhc from the autonomous navigation sensors 15. The processor 11 accumulates the direction of travel and the vehicle speed indicated by the received vehicle parameters Pvhc. The processor 11 also receives the positional data Dcpv from the receiver 16. Based on the accumulation results of the direction of travel and the vehicle speed, and the positional data Dcpv, the processor 11 calculates an accurate current position Ppcv of the vehicle on the working area 13 (step S105).

The processor 11 then accesses the database DB1 for reading data representing a portion covering a predetermined range R2 from the first cartographic data Dcgp1 representing the map that covers the above described basic area into frame memory reserved on the working area 13 (step S106). The predetermined range R2 is the periphery of the accurate current position Ppcv calculated in step S105. For convenience, assume in the present embodiment that the predetermined range R2 is the same as a range covered by a map displayed later on the display unit 19.

Figure 9A:
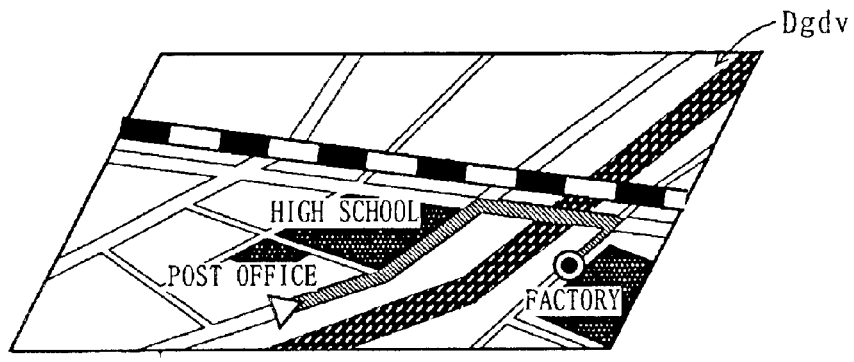
FIG. 9A is a schematic illustration showing a guide image represented by guide image data Dgdv generated by the processor 11 of FIG. 2.

The processor 11 then generates vehicle guide image data Dgdv (step S107). More specifically, in step S107, the processor 11 first selects a node string (or a link string) included in the predetermined range R2 from the optimal route data Dprv generated in step S104. The processor 11 then overlays the optimal route represented by the selected node sting (or link string) on the map represented by the first cartographic data Dcgp1 stored on the frame memory. Also overlaid on this map is a mark indicating the current position Ppcv obtained in step S105, thereby completing the guide image data Dgdv on the frame memory. This guide image data Dgdv represents a guide image as illustrated in FIG. 9A, having the optimal route (refer to a back-slashed portion) and the current position of the vehicle (refer to a triangular mark) depicted thereon.

The processor 11 then transmits the guide image data Dgdv generated in step S107 to the display unit 19 (step S108). The display unit 19 carries out display processing based on the received guide image data Dgdv for displaying on its screen the guide image as illustrated in FIG. 9A. As such, the main device 1 presents the guide image to the user, thereby guiding the user who is driving the vehicle to the starting point SP to the destination point DP.

The processor 11 then determines whether the vehicle has arrived at the destination point DP (step S109). More specifically, when the current position Ppcv calculated in step S105 coincides with the destination point DP set in step S102, the processor 11 determines that no further guidance is required for the driving user, and ends the procedure of FIG. 6.

On the other hand, when it is determined that the vehicle has not yet arrived at the destination point DP, the processor 11 determines whether the user is going to get off the vehicle (step S1010). More specifically, in step S1010, the processor 11 determines that whether the timing notification Ntrs has been received from the second input unit 18. As described above, when the user travels as illustrated in FIG. 5, the user operates the second input unit 18 before getting off the vehicle at the intermediate point IP. In response to this operation, the timing notification Ntrs is transmitted from the second input unit 18 to the processor 11. If the timing notification Ntrs has not been received in step S101, the processor 11 determines that the user is not going to get off, and returns to step S105 for continuing the vehicle navigation.

On the other hand, if the timing notification Ntrs has been received in step S1010, the processor 11 determines that the user is now going to get off the vehicle with the sub-device 2. That is, the processor 11 determines that the sub-device 2 is going to carry out processing required for off-vehicle navigation to guide the user traveling outside the vehicle to the destination point DP. As described with reference to FIG. 2, however, the second cartographic data Dcgp2 and the second road network data Dntw2 used for off-vehicle navigation are stored in the storage unit 14 of the main device 1. Furthermore, the coordinate value Cdp of the destination point DP is set only in the main device 1, and not in the sub-device 2.

Figure 10:
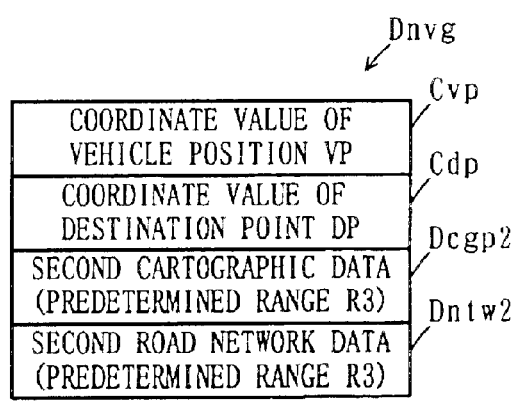
FIG. 10 is an illustration showing the structure of navigation data Dnvg generated by the processor 11 of FIG. 2.

For this reason, the processor 11 generates navigation data Dnvg required for the off-vehicle navigation for transmission to the sub-device (step S1011). More specifically, the processor 11 first accesses the database DB1 for reading data representing a portion covering a predetermined range R3 from the second cartographic data Dcgp2 representing the map covering the above described basic area into the working area 13. The processor 11 further reads data representing a portion covering the predetermined range R3 from the second cartographic data Dntw2 representing the road network covering the above described basic area. The predetermined range R3 is a range including the current position Ppcv calculated in step S105 and the destination point DP received in step S101, that is, the range assumed to be traveled by the user. The processor 11 then generates, on the working area 13, the navigation data Dnvg including coordinate values of the current position Ppcv collectively as a coordinate value Cvp of a vehicle position VP, the coordinate value Cdp of the destination point DP, and the second cartographic data Dcgp2 and the second road network data Dntw2 representing the map and the road network, respectively, of the predetermined range R3, as illustrated in FIG. 10. The processor 11 then transfers the navigation data Dnvg to the communications controller 110. As illustrated in FIG. 7, the communications controller 110 transmits the received navigation data Dnvg via the cable 3 to the communications controller 24 of the sub-device 2. After the navigation data Dnvg has been transmitted, the processor 11 ends the procedure of FIG. 6. The user then stops the engine of the vehicle, removes the sub-device 2 from the cable 3, and heads for the destination point DP with the sub-device 2 by means other than the vehicle (on foot, for example).

As described above, the processor 21 of the sub-device 2 executes the program PG2. FIG. 8 is a flowchart showing the procedure described in the program PG2 and carried out by the processor 21. In FIG. 8, the processor 21 waits for the navigation data Dnvg to come (step S201). When the navigation d at a Dnvg comes, the processor 21 stores it in the working area 23 (step S202). After the navigation data Dnvg is stored, the processor 21 carries out the off-vehicle navigation. The processor 21 first sets the coordinate value Cvp of the vehicle position VP and the coordinate value Cdp of the destination point DP included in the received navigation data Dnvg as the original point and the end point, respectively, for route search carried out in the next step S204 (step S203).

The processor 21 then uses a scheme typified by the Dijkstra's algorithm for deriving an optimal route from the vehicle position VP to the destination point DP from the second road network data Dntw2 on the working area 23 and generating optimal route data Dprw for outside of the vehicle on the working area 23 (step S204). The optimal route data Dprw is a string of nodes (or links) representing the optimal route obtained in step S204.

The processor 21 then accumulates the direction of travel and the number of steps taken by the user, both indicated by the travel parameters Pwkr transmitted from the autonomous navigation sensors 25. The processor 21 then multiplies the accumulation results of the number of steps by a stride length set as a default or registered by the user for calculating the distance traveled by the walking user. The processor 21 further receives the positional data Dcpw from the receiver 26. Based on the accumulation results of the direction of travel, the distance traveled, and the positional data Dcpw, the processor 11 calculates an accurate current position Ppcw of the user on the working area 23 (step S205).

The processor 21 then reads data representing a portion covering a predetermined range R4 of the map from the second cartographic data Dcgp2 representing the predetermined range R3 of the map stored in the working area 23 into frame memory reserved on the working area 23 (step S206). Here, the predetermined range R4 is the periphery of the current position Ppcw calculated in step S205. For convenience, assume in the present embodiment that the predetermined range R4 is the same as a range covered by a map displayed later on the display unit 27.

Figure 9B:
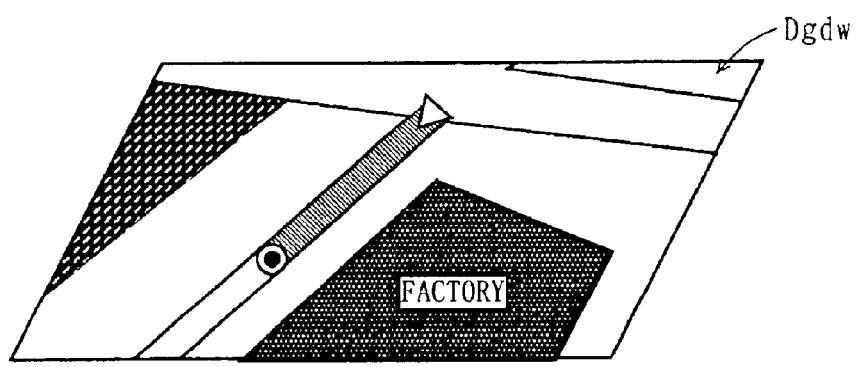
FIG. 9B is a schematic illustration showing a guide image represented by guide image data Dgdw generated by the processor 21 of FIG. 2.

The processor 21 then generate guides image data Dgdw for outside of the vehicle (step S207). More specifically, the processor 21 first selects a node string (or a link string) included in the predetermined range R4 from the optimal route data Dprw generated in step S204. The processor 21 then overlays the optimal route represented by the selected node string (or link string) on the map represented by the second cartographic data Dcgp2 stored on the frame memory. Also overlaid on this map is a mark indicating the current position Ppcw obtained in step S205, thereby completing the guide image data Dgdw on the frame memory. This guide image data Dgdw represents a guide image as illustrated in FIG. 9B, including the map covering the periphery of the current position of the user who is traveling outside of the vehicle, with the optimal route (refer to a back-slashed portion) and the current position of the user (refer to a triangular mark) depicted thereon.

The processor 21 then transmits the guide image data Dgdw generated in step S207 to the display unit 27 (step S208). The display unit 27 carries out display processing based on the received guide image data Dgdw for displaying on its screen the guide image as illustrated in FIG. 9B. As such, the sub-device 2 presents the guide image for outside of the vehicle to the user, thereby guiding the user from the vehicle position VP to the destination point DP.

The processor 21 then determines whether the user has arrived at the destination point DP (step S209). Specifically, when the current position Ppcw calculated in step S205 coincides with the destination point DP set in step S203, the processor 21 determines that no further guidance is required for the walking user, and ends the procedure in FIG. 8. Now, the navigation system NS1 has guided the user going from the starting point SP to the destination point DP by vehicle and then on foot. On the other hand, if the user has not yet arrived at the destination point DP, the processor 21 determines to continue the off-vehicle navigation, and returns to step S205.

As such, in the navigation system NS1, when the first input unit 17 is operated, the navigation data Dnvg as illustrated in FIG. 10 is automatically transmitted from the main device 1 to the sub-device 2. As stated above, the navigation data Dnvg includes the coordinate value Cvp of the vehicle position VP (which corresponds to the intermediate point IP), the coordinate value Cdp of the destination point DP, and the second cartographic data Dcgp2 and the second road network data Dntw2 representing the map and the road network, respectively, covering the predetermined range R3. By using the received navigation data Dnvg, the sub-device 2 guides the user outside of the vehicle from the vehicle position VP to the destination point DP. As such, even when vehicle navigation and off-vehicle navigation are performed by the main device 1 and the sub-device 2 separately, all the user has to do is to operate the first input unit 17. Thus, the navigation system NS1 can smoothly guide the user going by vehicle and then on foot from the starting point SP to the destination point DP.

Furthermore, compared with the conventional navigation system (refer to U.S. Pat. No. 6,125,326), the navigation system NS1 has a distinguishable feature that the sub-device 2 guides the user outside of the vehicle to the destination point DP based on the coordinate value Cdp included in the received navigation data Dnvg. Therefore, the user does not have to input the destination point DP in the sub-device 2. Thus, it is possible to provide the navigation system NS1, which is more convenient than the conventional system.

Figure 11:
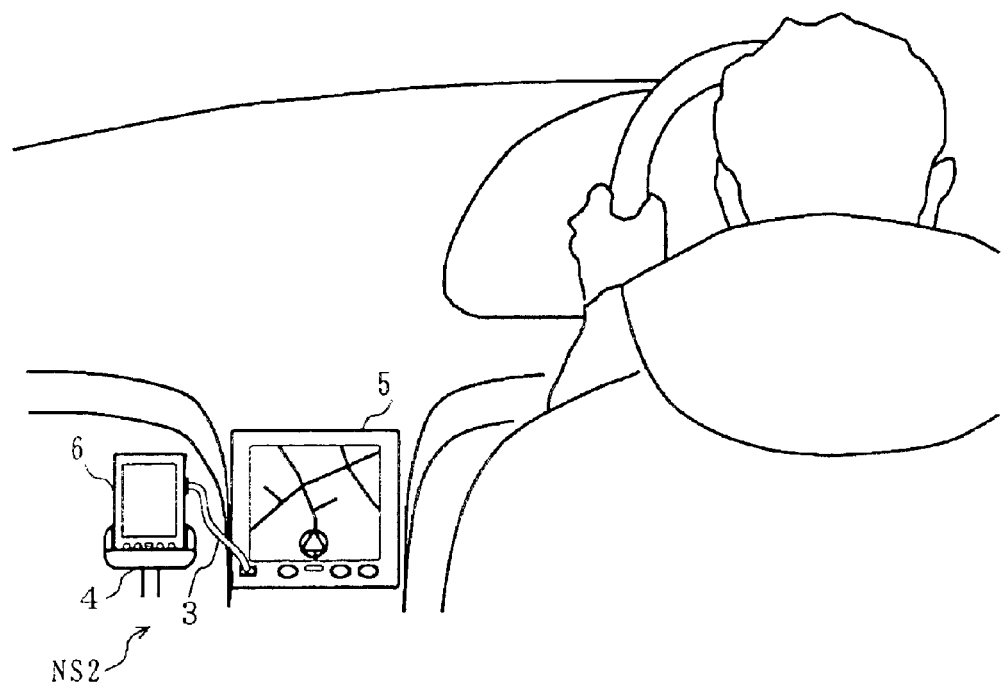
FIG. 11 is an illustration showing the overall structure of a navigation system NS2 according to another preferred embodiment of the present invention.

Described next is a navigation system NS2 according to a second embodiment of the present invention. As illustrated in FIG. 11, the navigation system NS2 is similar in construction to the navigation system NS1 (refer to FIG. 1), but different therefrom only in that a main device 5 and a sub-device 6 are provided in place of the main device 1 and the sub-device 2. Therefore, components corresponding to those illustrated in FIG. 1 are provided with the same reference numeral, and are not described herein.

Figure 12:
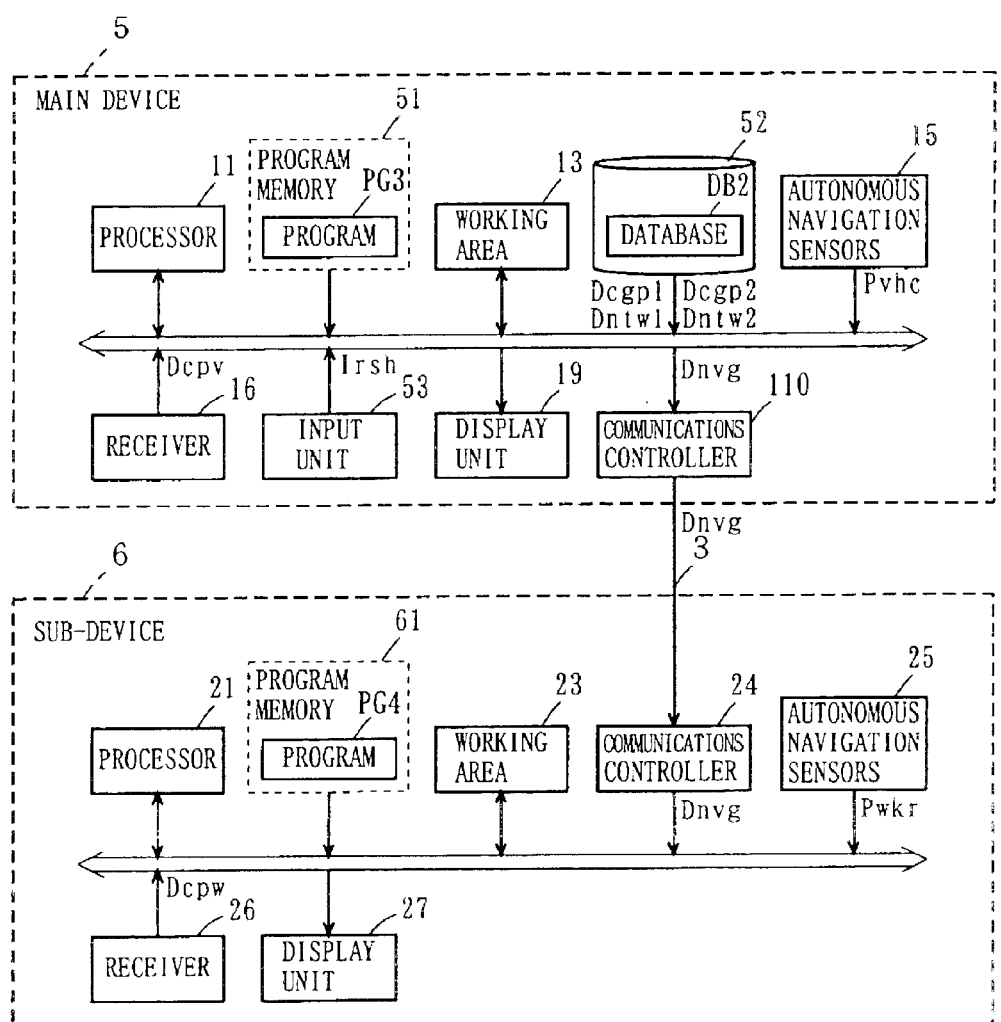
FIG. 12 is a block diagram showing the detailed construction of a main device 5 and a sub-device 6 shown in FIG. 11.

With reference to FIG. 12, described next is the detailed construction of the main device 5 and the sub-device 6. As illustrated in FIG. 12, the main device 5 is similar in construction to the main device 1, but different therefrom only in that program memory 51, a storage unit 52, and an input unit 53 are provided in place of the program memory 12, the storage unit 14, and the first input unit 17, and that the second input unit 18 is not provided. Therefore, components of the main device 5 illustrated in FIG. 12 corresponding to those of the main device 1 illustrated in FIG. 2 are provided with the same reference numeral, and are not described herein.

The program memory 51 previously stores a computer program (hereinafter simply referred to as program) PG3 executed by the processor 11.

Figure 13:
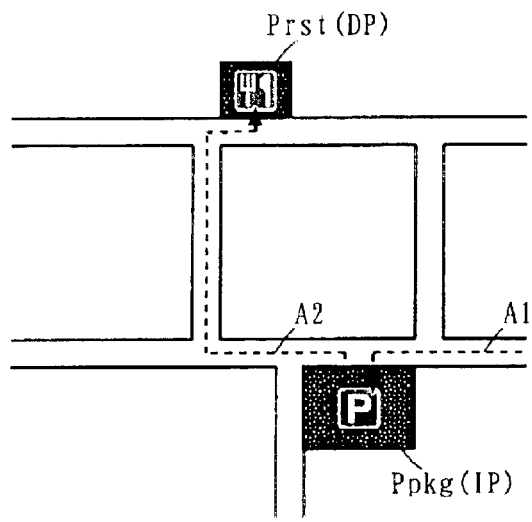
FIG. 13 is an illustration for demonstrating a relation between a destination point DP and an intermediate point IP for use in the main device 5 of FIG. 11.

The storage unit 51 stores database DB2. The database DB2 is constructed in consideration of a relation between the intermediate point IP and the destination point DP. In the first embodiment, the intermediate point IP and the destination point DP have no relation to each other. That is, the user arbitrarily selects the intermediate point IP, and gets off the vehicle there to travel to the destination point DP by means other than the vehicle. In the second embodiment, such a case is considered as that where the intermediate point IP and the destination point DP have some relation. For example, as illustrated in FIG. 13, consider a case where a restaurant Prst owns a parking lot Ppkg only a short walk away. In this case, to go to the restaurant Prst (destination point DP) from a starting point SP (now shown), the user first travels to the parking lot Ppkg (intermediate point IP) by vehicle, as indicated by an arrow Al, and then travels from the parking lot Ppkg to the restaurant Prst by means other than the vehicle (on foot, for example), as indicated by an arrow A2. As such, the destination point DP may relate to a particular intermediate point IP. The database DB2 is generated in consideration of the above relation between the destination point DP and the intermediate point IP, and is structured illustrated in FIG. 14A.

Figure 14A:
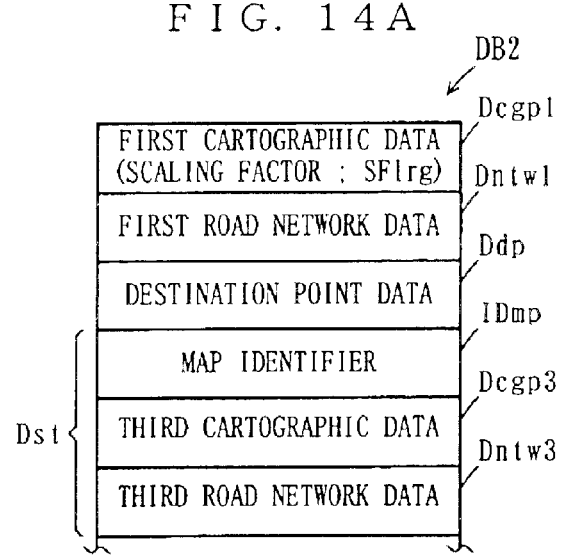
FIG. 14A is a schematic illustration showing the detailed structure of a database DB2 shown in FIG. 11.

In FIG. 14A, the database DB2 is similar in construction to the database DB1 (refer to FIG. 3), but different therefrom in that plurality pieces of destination point data Ddp is included in place of the second cartographic data Dcgp2 and the second road network data Dntw2, and that the destination point data Ddp includes several data sets Dst composed of a map identifier Idmp, third cartographic data Dcgp3, and third road network data Dntw3. Therefore, the pieces of data in FIG. 14A corresponding to those illustrated in FIG. 3 are provided with the same reference character, and are not described herein.

Figure 14B:
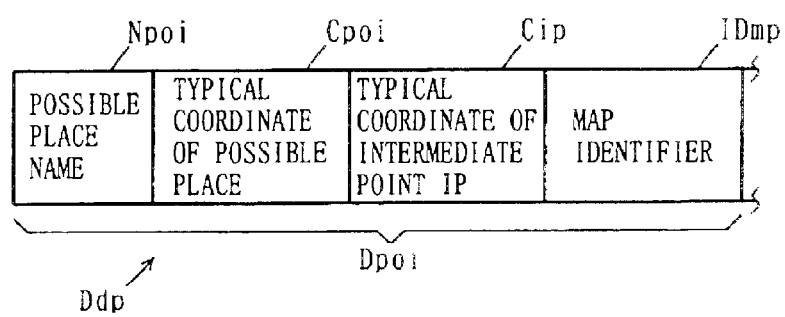
FIG. 14B is a schematic illustration showing the detailed structure of destination point data Ddp shown in FIG. 14A.

The destination point data Ddp is generated with POIX (Point Of Interest exchange language). As illustrated in FIG. 14B, the destination point data Ddp includes at least one piece of possible place data Dpoi of a possible place as the destination point DP. In FIG. 14B, the possible place data Dpoi includes a possible place name Npoi, typical coordinates Cpoi representing the possible place, typical coordinate Cip representing the intermediate point IP related to the possible place, and the map identifier Idmp. The map Idmp is information for uniquely identifying the third cartographic data Dcgp3 and route search data Drsh (refer to FIG. 14A) that include an optimal route from the typical coordinate Cpoi to the typical coordinate Cip.

Figure 15:
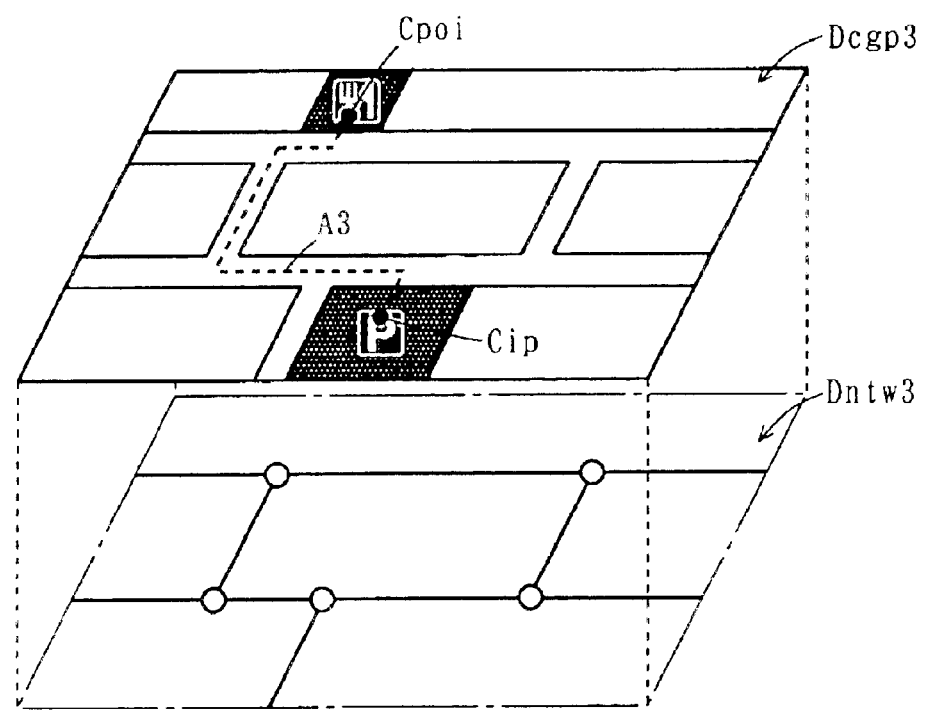
FIG. 15 is a schematic illustration showing a map and a road network represented by third cartographic data Dcgp3 and third road network data Dntw3 shown in FIG. 14.

In the data set Dst illustrated in FIG. 14A, the map identifier IDmp uniquely identifies the subsequent third cartographic data Dcgp3 and third road network data Dntw3. The third cartographic data Dcgp3 represents, as illustrated in FIG. 15, a map obtained by scaling down the state of the ground surface on the area including the typical coordinates Cpoi and Cip. The map represented by the third cartographic data Dcgp3 further includes the optimal route connecting between these typical coordinates Cpoi and Cip, as indicated by an arrow A3 in FIG. 15. As illustrated in FIG. 15, the third road network data Dntw3 represents the connecting relation among roads of the network on the map represented by the third cartographic data Dcgp3 contained in the same data set Dst by using nodes and links.

In FIG. 12, the input unit 53 is operated by the user for carrying out route search in the vehicle navigation, In response to the operation, the input unit 53 generates the search start instruction Irsh as described above for transmission to the processor 11. The user also operates the input unit 53 to input information required for setting an original point and an end point for route search to the main device 5.

The sub-device 6 is similar in construction to the sub-device 2, but different therefrom only in that program memory 61 is provided in place of the program memory 22. Therefore, components of the sub-device 6 illustrated in FIG. 12 corresponding to those of the sub-device 2 illustrated in FIG. 2 are provided with the same reference numeral or character, and are not described herein. The program memory 61 previously stores a computer program (hereinafter simply referred to as program) PG4 executed by the processor 21.

Figure 16:
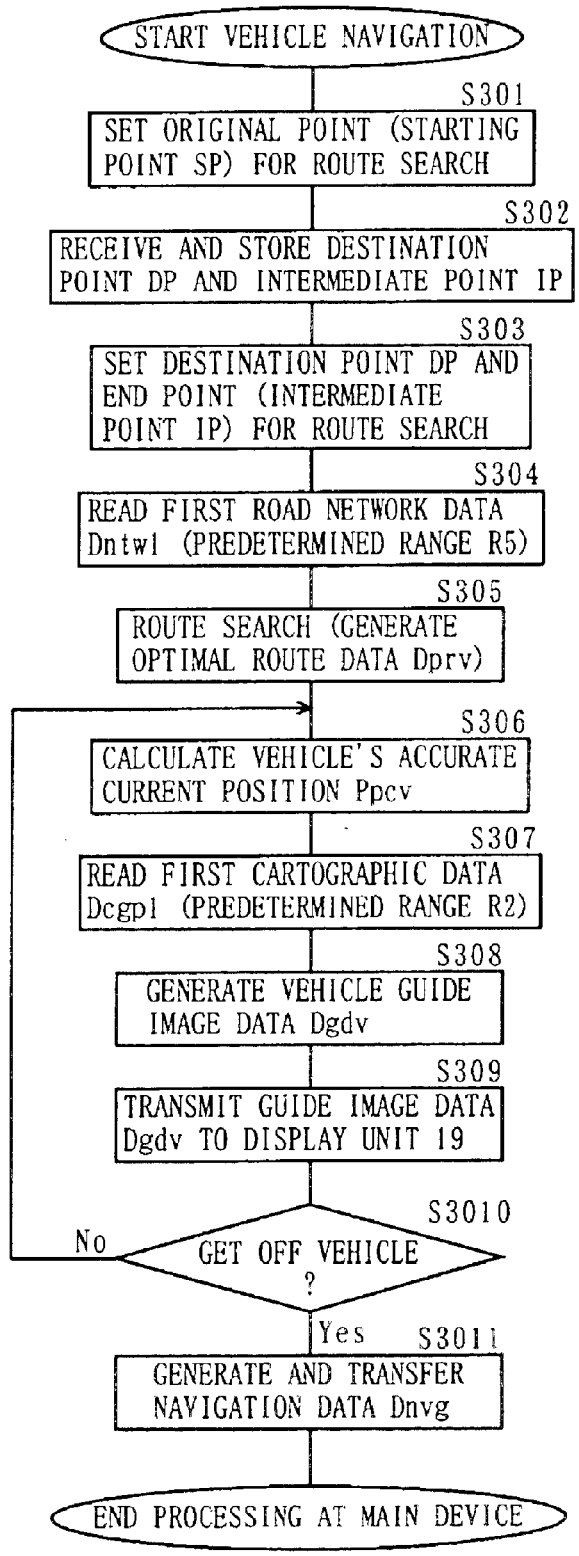
FIG. 16 is a flowchart showing the procedure carried out by a processor 11 shown in FIG. 12.
Figure 17:
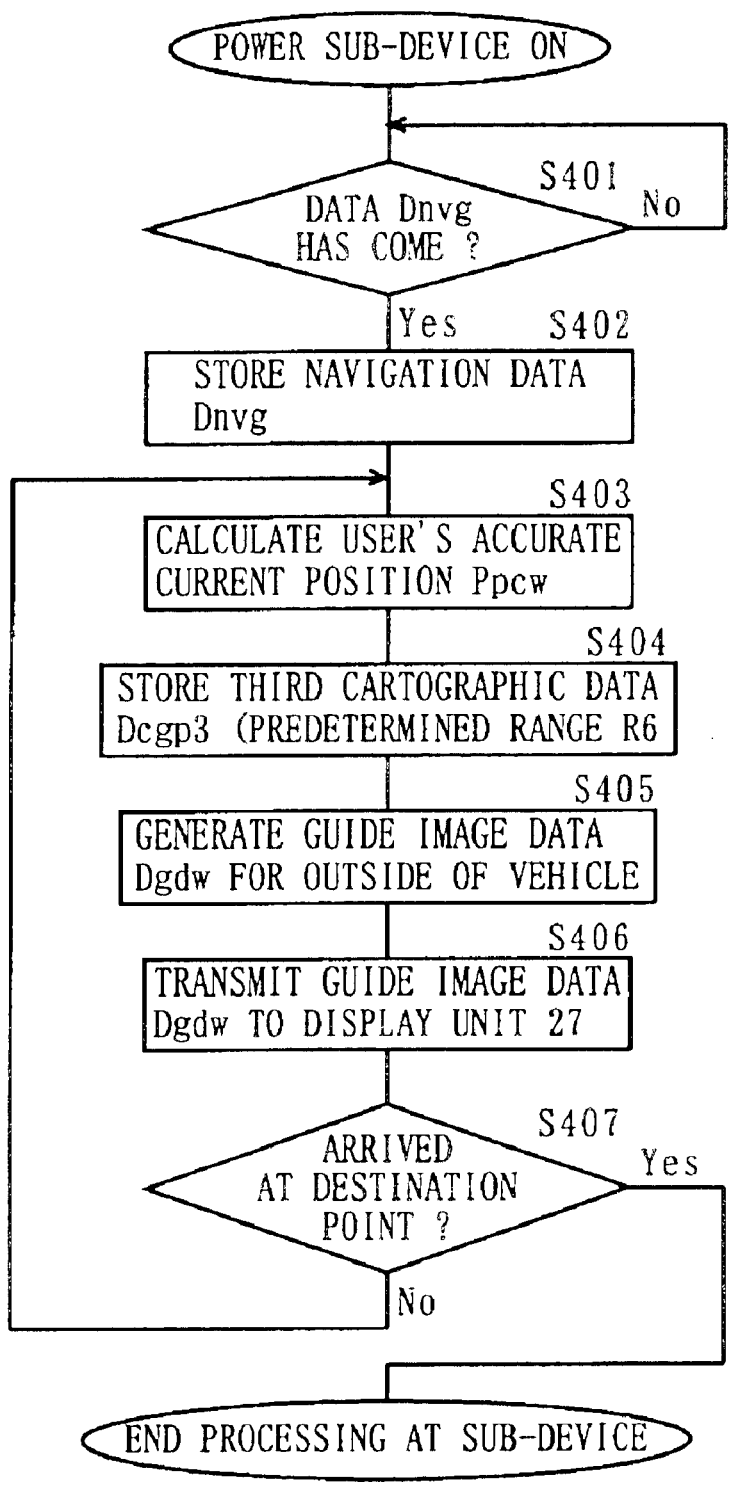
FIG. 17 is a flowchart showing the procedure carried out by a processor 21 shown in FIG. 12.

With reference to FIGS. 16 and 17, described next is the operation of the navigation system NS2 in a case where the user travels as described with reference to FIG. 13. After the user starts driving the vehicle, the main device 5 and the sub-device 6 are supplied with drive power. Then, the processor 11 of the main device 5 starts executing the program PG3. The processor 21 of the sub-device 6 also starts executing the program PG4.

The user first operates the input unit 53 of the main device 5. In response to this operation, the input unit 53 transmits the above described search start instruction Irsh as described above to the processor 11. On receiving the search start instruction Irsh, the processor 11 carries out processing required for vehicle navigation whose procedure has been described in the program PG3. FIG. 16 is a flowchart showing the procedure of vehicle navigation. In FIG. 16, the processor 11 first sets an original point (starting point SP) for route search (step S301). More specifically, in step S301, the user operates the input unit 53 to designate the starting point SP. In response to the operation, the processor 11 represents the designated starting point SP with longitude and latitude coordinates, for example. In the following description, these longitude and latitude coordinates of the starting point SP are collectively referred to as a coordinate value Csp. The processor 11 stores the coordinate value Csp of the starting point SP in the working area 13, thereby setting the original point for route search carried out later in step S305.

The processor 11 then accesses the database DB2 for reading one or more the possible place names Npoi from the destination point data Ddp into the working area 13. The processor 11 then transmits the possible place names Npoi stored on the working area 13 to the display unit 19. The display unit 19 displays the received possible place names Npoi on the screen. The user uses the input unit 53 to select a desired one of the displayed possible place names Npoi as the destination point DP. If the user cannot find any place he or she desires to set as the destination point DP, the user does not select any from the displayed names Npoi, but designates another place as the destination point DP. In this case, the user is guided to the destination point DP in a manner similar to that in the first embodiment.

After any Npoi has been selected, the processor 11 accesses the database DB2 to retrieve the typical coordinates Cpoi and Cip from the destination point data Ddp including the selected possible place name Npoi. The processor 11 stores the retrieved typical coordinates Cpoi and Cip in the working area 13 (step S302), and sets the stored typical coordinates Cip of the intermediate point IP as the end point for route search carried out later in step S305 (step S303).

The processor 11 then reads data representing a portion covering a predetermined range R5 of the road network from the above described first road network data Dntw1 into the working area 13 (step S304). The predetermined range R5 is a range assumed to include an optimal route from the set original point to end point for route search, generally, the range surrounded by a rectangle including the starting point SP and the intermediate point IP.

The processor 11 then derives, from the first road network data Dntw1 read in step S304, the optimal route from the original point set in step S301 (starting point SP) to the end point set in step S303 (intermediate point IP), and generates optimal route data Dprv for the vehicle on the working area 13 (step S305). This step is similar to step S104 of FIG. 6. The optimal route data Dprv is a string of nodes (or links) representing the optimal route derived in step S305.

The processor 11 then calculates an accurate current position Ppcv of the vehicle on the working area 13 (step S306). This step is similar to step S105 of FIG. 6. The processor 11 then accesses the database DB1 for reading data representing a portion covering the predetermined range R2 of the map from the first cartographic data Dcgp1 into frame memory reserved on the working area 13 (step S307). This step is similar to the step S106. The processor 11 then generates vehicle guide image data Dgdv as illustrated in FIG. 9A (step S308), which is similar to step S107. The processor 11 then transmits the guide image data Dgdv generated in step S308 to the display unit 19 (step S309), where an guide image is displayed. As such, the main device 5 presents the guide image to the user, thereby guiding the user who is driving the vehicle from the starting point SP to the intermediate point IP.

The processor 11 determines whether the user is going to get off the vehicle (step S3010). More specifically, in step S3010, the processor 11 determines whether the vehicle has arrived at the intermediate point IP. That is, if the current position Ppcv obtained in step S306 does not coincide with the intermediate point IP set in step S302, the processor 11 determines that the user is not going to get off the vehicle, and returns to step S306 for continuing the vehicle navigation.

Figure 18:
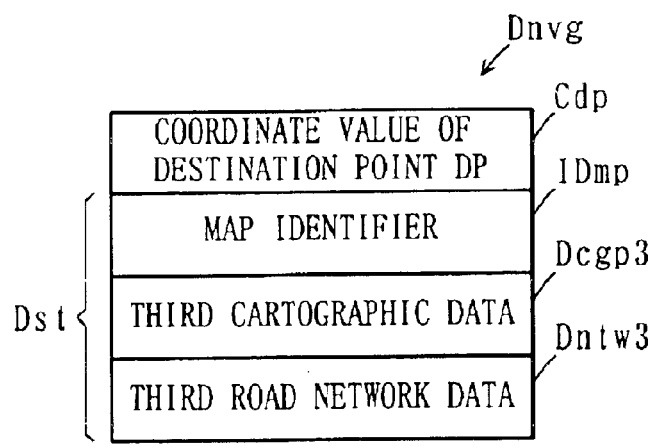
FIG. 18 is an illustration showing the structure of navigation data Dnvg generated by the processor 11 of FIG. 12.

On the other hand, if it is determined that the vehicle has arrived at the intermediate point IP, the processor 11 determines that the user is going to get off the vehicle and start traveling with the sub-device 6 outside of the vehicle. Based on this determination, the processor 11 generates navigation data Dnvg required for off-vehicle navigation, and transmits the navigation data Dnvg to the sub-device 6 (step S3011). More specifically, the processor 11 first accesses the database DB2 to retrieve the map identifier IDmp from the possible place data Dpoi including the possible place name Npoi designated by the user. The processor 11 also accesses the database DB2 to read the data set Dst having the same map identifier IDmp as the retrieved one into the working area 13. What is read at this time includes the third cartographic data Dcgp3 and the third road network data Dntw3 representing the map and the road network, respectively, covering both of the intermediate point IP and the destination point DP. Then, as illustrated in FIG. 18, the processor 11 generates navigation data Dnvg including the coordinate value Cdp of the destination point DP stored in step S302 in the working area 13, and the data set Dst read in step S3011, and transfers the generated navigation data Dnvg to the communications controller 110. The communications controller 110 transmits the received navigation data Dnvg via the cable 3 to the communications controller 24 of the sub-device 6, as illustrated in FIG. 7. After the navigation data Dnvg is transmitted, the processor 11 ends the procedure of FIG. 16. The user then stops the engine of the vehicle, removes the sub-device from the cable 3, and then heads for the destination point DP with the sub-device 6.

As described above, the processor 21 of the sub-device 6 executes the program PG4. FIG. 17 is a flowchart showing the procedure described in the program PG4 and carried out by the processor 21. In FIG. 17, the processor 21 stores the received navigation data Dnvg in the working area 23 in a similar manner to that in steps S201 and S202 (steps S401, S402). After storing, the processor 21 carries out processing required for the off-vehicle navigation.

The processor 21 then calculates an accurate current position Ppcw of the user on the working area 23 in a similar manner as that in step S205 (step S403). Note that, when the receiver 26 is implemented by a PHS receiver, the receiver 26 has to establish a communications connection with a PHS base station before executing step S403. Then, the receiver 26 receives information for specifying the current position. Also note that the sub-device 6 does not has to carry out route search, in contrast to the sub-device 2 of the navigation system NS1 that carries out route search in step S204. This is because, in the navigation data Dnvg, the optimal route from the intermediate point IP to the destination point DP has already been depicted on the map represented by the third cartographic data Dcgp3, as illustrated in FIG. 13.

The processor 21 then reads data representing a portion covering a predetermined range R6 of the map from the third cartographic data Dcgp3 stored in the working area 23 into frame memory reserved on the working area 23 (step S404). Here, the predetermined range R6 is the periphery of the current position Ppcw calculated in step S403. For convenience, assume in the present embodiment that the predetermined range R6 is a range of a map displayed later on the display unit 27.

The processor 21 then generates guide image data Dgdw for outside of the vehicle (step S405). More specifically, the processor 21 overlays a mark indicating the current position Pcw obtained in step S403 on the map represented by the third cartographic data Dcgp3 stored on the frame memory, thereby completing the guide image data Dgdw on the frame memory. The guide image data Dgdw represents such a guide image for outside of the vehicle as that the map covering the periphery of the current position of the user, with the optimal route (refer to a dotted arrow line A4) and the current position of the user (refer to a triangular mark) depicted thereon.

Figure 19:
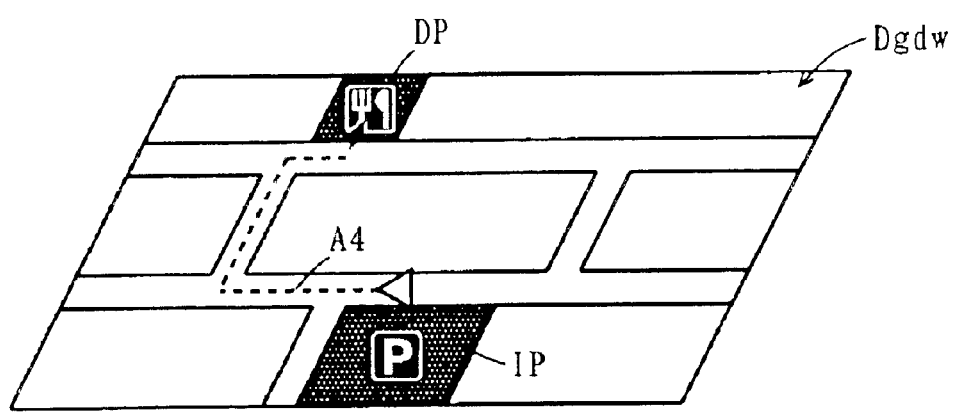
FIG. 19 is an illustration showing a guide image represented by guide image data Dgdw generated by the processor 21 of FIG. 12.

The processor 21 then transmits the guide image data Dgdw generated in step S405 to the display unit 27 (step S406). The display unit 27 carries out display processing based on the received guide image data Dgdw for displaying a guide image as illustrated in FIG. 19 on the screen. As such, the sub-device 6 presents the guide image for outside of the vehicle to the user, thereby guiding the user outside of the vehicle from the intermediate point IP to the destination point DP.

The processor 21 then determines whether the user has arrived at the destination point DP (step S407). Specifically, if the current position Ppcw calculated in step S403 coincides with the destination point DP contained in the navigation data Dnvg received in step S401, the processor 21 determines that no further guidance is required for the walking user, and ends the procedure of FIG. 17. Now, the navigation system NS2 has guided the user traveling by vehicle and then on foot from the starting point SP to the destination point DP. On the other hand, if the user has not yet arrived at the destination point DP, the processor 21 determines to continue the off-vehicle navigation, and returns to step S403.

In the navigation system NS1, the user has to operate the second input unit 18 to designate timing of change from vehicle navigation to off-vehicle navigation. In the navigation system NS2, however, if there is any relation between the intermediate point IP and the destination point DP, the navigation data Dnvg is automatically transmitted to the sub-device 6, as illustrated in step S3011 of FIG. 16. Therefore, the user does not have to designate such timing of change as described above, thereby reducing the number of times the user has to operate the main device 5. Thus, it is possible to provide the more convenient navigation system NS2, which is more convenient to use.

Figure 20:
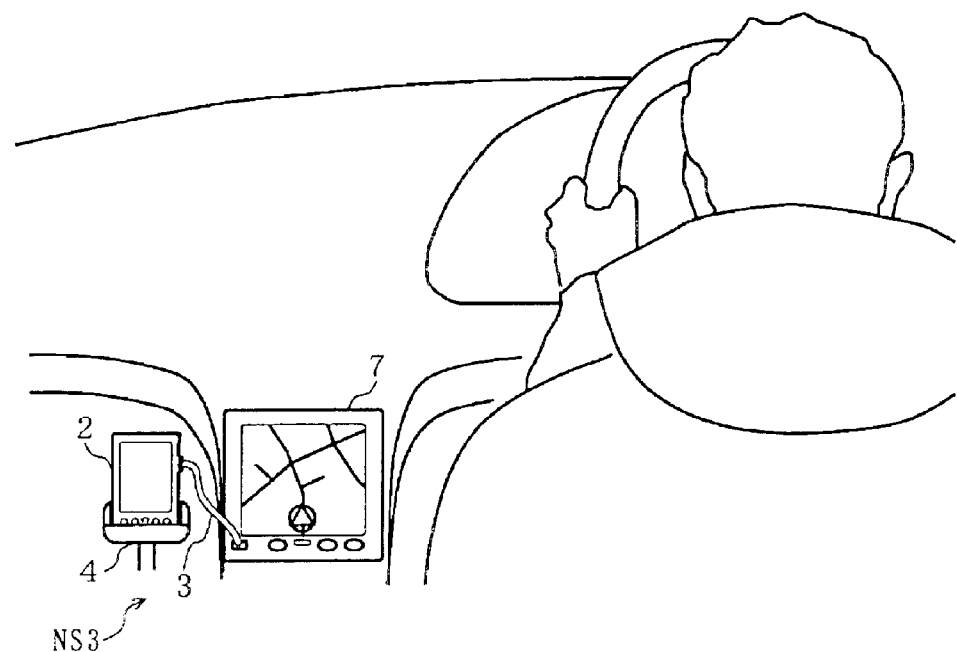
FIG. 20 is an illustration showing the overall construction of a navigation system NS3 according to a still another embodiment of the present invention.

With reference to FIG. 20, described next is a navigation system NS3 according to a third embodiment of the present invention. As illustrated in FIG. 20, the navigation system NS3 is similar in construction to the navigation system NS1 (refer to FIG. 1), but different in that a main device 7 is provided in place of the main device 1. Therefore, components of FIG. 20 corresponding to those of FIG. 1 are provided with the same reference numeral, and are not described herein.

With reference to FIG. 21, described next is the detailed construction of the main device 7. As illustrated in FIG. 21, the main device 7 is similar in construction to the main device 1, but different therefrom in that program memory 71 and an input unit 72 are provided in place of the program memory 12 and the first input unit 17, and that the second input unit 18 is not required. Therefore, components of the main device 7 illustrated in FIG. 21 corresponding to those of the main device 1 illustrated in FIG. 2 are provided with the same reference numeral, and are not described herein.

The program memory 71 previously stores a computer program (hereinafter simply referred to as a program) PG5 executed by the processor 11. The input unit 72 is operated by the user when he or she desires to carry out route search in the vehicle navigation. In response to the operation, the input unit 72 generates the search start instruction Irsh as described above for transmission to the processor 11. The user further operates the input unit 72 to input the starting point SP, the intermediate point IP, and the destination point DP to the main device 7.

As has been described with reference to FIG. 5, the user may go from the starting point SP to the intermediate point IP by vehicle, and then goes to the destination point DP by means other than the vehicle. In this case, the user may have determined both of the intermediate point IP and the destination point DP at the time of starting the travel. The navigation system NS3 is suitable for such case.

Figure 22:
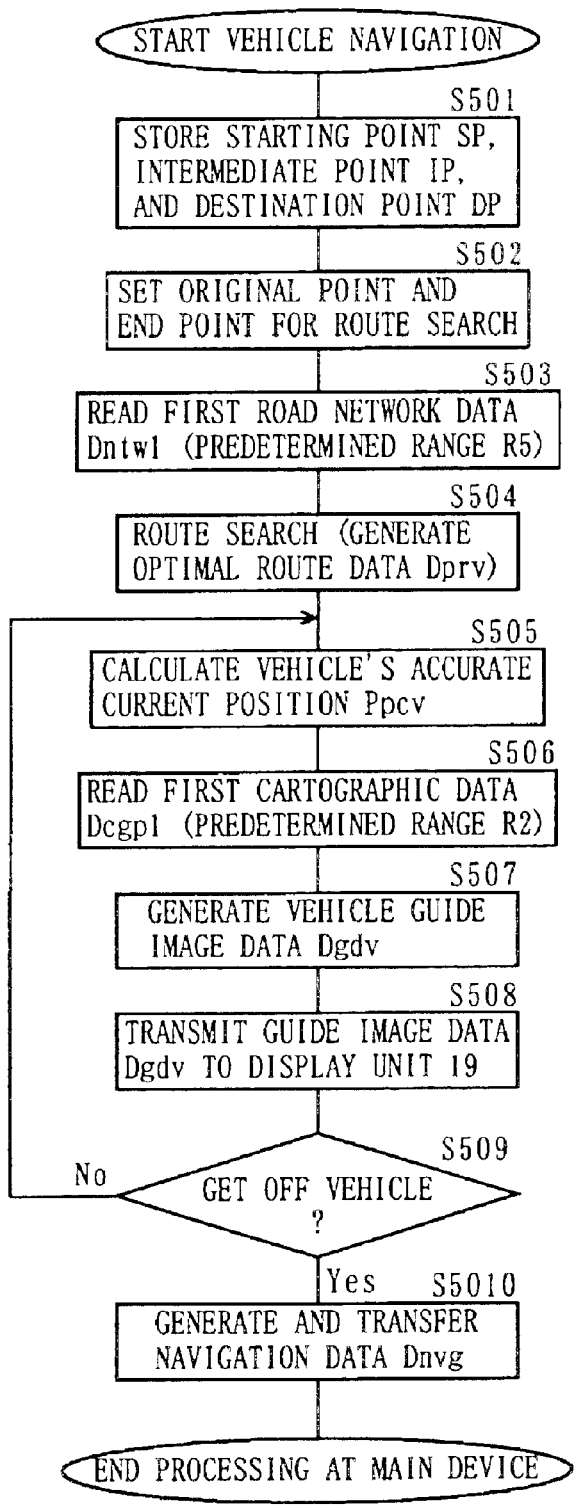
FIG. 22 is a flowchart showing the procedure carried out by a processor 11 of FIG. 21.

With reference to FIG. 22, described next is the operation of the navigation system NS3 in a case when the user travels as illustrated in FIG. 5. After the user starts driving the vehicle, the main device 7 and the sub-device 2 are supplied with drive power. The processor 11 of the main device 7 starts executing the program PG5. The processor 21 of the sub-device 2 starts executing the program PG2.

First, the user operates the input unit 72 of the main device 7. In response to this operation, the input unit 72 transmits the above described search start instruction Irsh to the processor 11. In response to the search start instruction Irsh, the processor 11 carries out vehicle navigation whose procedure is described in the program PG5. FIG. 22 is a flowchart showing the procedure of vehicle navigation. In FIG. 22, the processor 11 first retrieves the starting point SP, the intermediate point IP, and the destination point DP, and stores them in the working area 13 (step S501). More specifically, the user operates the input unit 72 for designating the starting point SP, the intermediate point IP, and the destination point DP. The input unit 72 transmits these designated points to the processor 11. The starting point SP, the intermediate point IP, and the destination point DP designated in step S501 are represented by longitude and latitude coordinates. In the following description, the longitude and latitude coordinates of the starting point SP are referred to as coordinate values Csp, those of the intermediate point IP are referred to as coordinate values Cip, and those of the destination point DP are as coordinate value Cdp.

Next to step S501, the processor 11 sets the stored coordinate values Csp and Cip as an original point and an end point, respectively, for route search carried out later in step S505 (step S502).

The processor 11 then reads data representing a portion covering the predetermined range R5 (refer to the second embodiment) of the road network from the first road network data Dntw1 into the working area 13 (step S503). The processor 11 then derives, as with step S104 of FIG. 6, an optimal route from the original point (starting point SP) and the end point (intermediate point IP) set in step S503 from the first road network data Dntw1 read in step S503, and generates optimal route data Dprv for vehicle on the working area 13 (step S504). The optimal route data Dprv is a string of nodes (or links) representing the optimal route derived in step S504.

The processor 11 then calculates an accurate current position Ppcv on the working area 13 (step S505), which is similar to step S103. The processor 11 then reads data representing a portion covering the predetermined range R2 (refer to the first embodiment) of the map from the first cartographic data Dcgp1 into the frame memory (step S506), which is similar to step S106. The processor 11 then generates the vehicle guide image data Dgdv representing the guide image as illustrated in FIG. 9A (step S507), which is similar to step S107. The processor then transmits the generated guide image data Dgdv to the display unit 19 (step S508), where a guide image as illustrated in FIG. 9A is displayed. As such, the main device 5 presents the guide image to the user, thereby guiding the user driving the vehicle from the starting point SP to the intermediate point IP.

The processor 11 then determines whether the user is going to get off the vehicle (step S509), which is similar to step S3010 of FIG. 16. If it is determined that the user is not going to get off, the processor 11 returns to step S505 for further vehicle navigation.

On the other hand, if it is determined that the user is going to get off, the processor 11 determines that the user is going to travel outside of the vehicle with the sub-device 2. Based on the determination, the processor 11 generates the navigation data Dnvg (refer to FIG. 10) for transmission to the sub-device 2 (step S5010), which is similar to step S1011 of FIG. 6. After the navigation data Dnvg has been transmitted, the processor 11 ends the procedure of FIG. 22. The user then stops the engine of the vehicle, removes the sub-device 2 from the cable 3, and then heads for the destination point on foot with the sub-device 2. Thereafter, the sub-device 2 carries out the off-vehicle navigation as illustrated in FIG. 8.

In the navigation system NS1, the user has to operate the second input unit 18 to input the timing of change from the vehicle navigation to the off-vehicle navigation in the main device 1. In the navigation system NS3, however, the intermediate point IP has been previously designated. Therefore, as shown in step S5010 of FIG. 22, the navigation data Dnvg is automatically transmitted to the sub-device 2. For this reason, the user does not have to input the timing of change in the main device 5, thereby reducing the number of times he or she operates the main device 5. Thus, it is possible to provide the navigation system NS3, which is more convenient to use.

Figure 23:
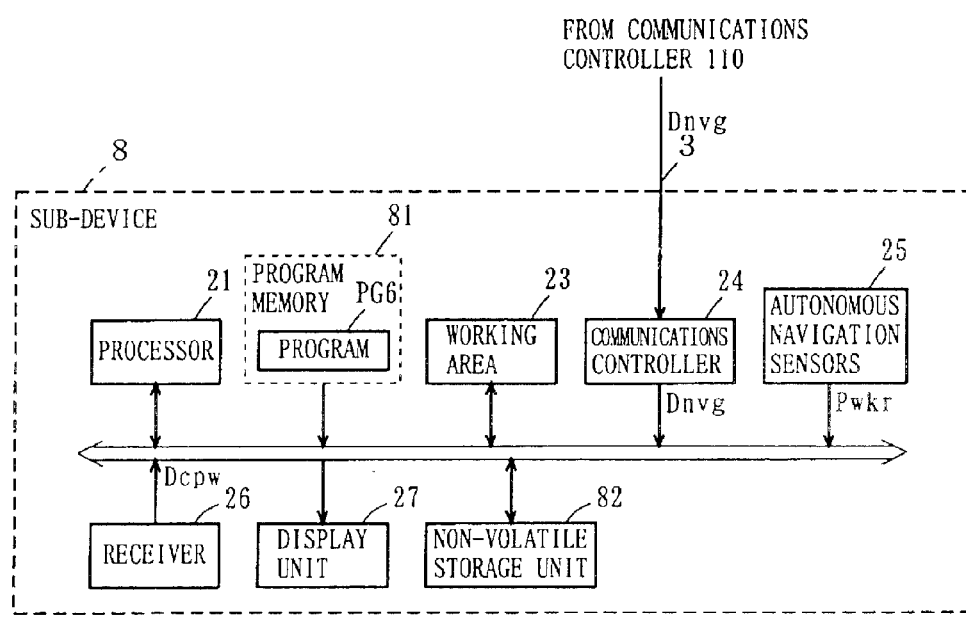
FIG. 23 is a block diagram showing the detailed construction of a sub-device 8, which is an example modification of the sub-device 2 of FIG. 21.

With reference to FIG. 23, described next is a sub-device 8, which is an example modification of the sub-device 2. The sub-device 8 is similar in construction to the sub-device 2, but different therefrom in that program memory 81 is provided in place of the program memory 22, and that a non-volatile storage unit 82 is further provided. Therefore, components of the sub-device 8 illustrated in FIG. 23 corresponding to those of the sub-device 2 illustrated in FIG. 21 are provided with the same reference numeral, and are not described herein.

Figure 24:
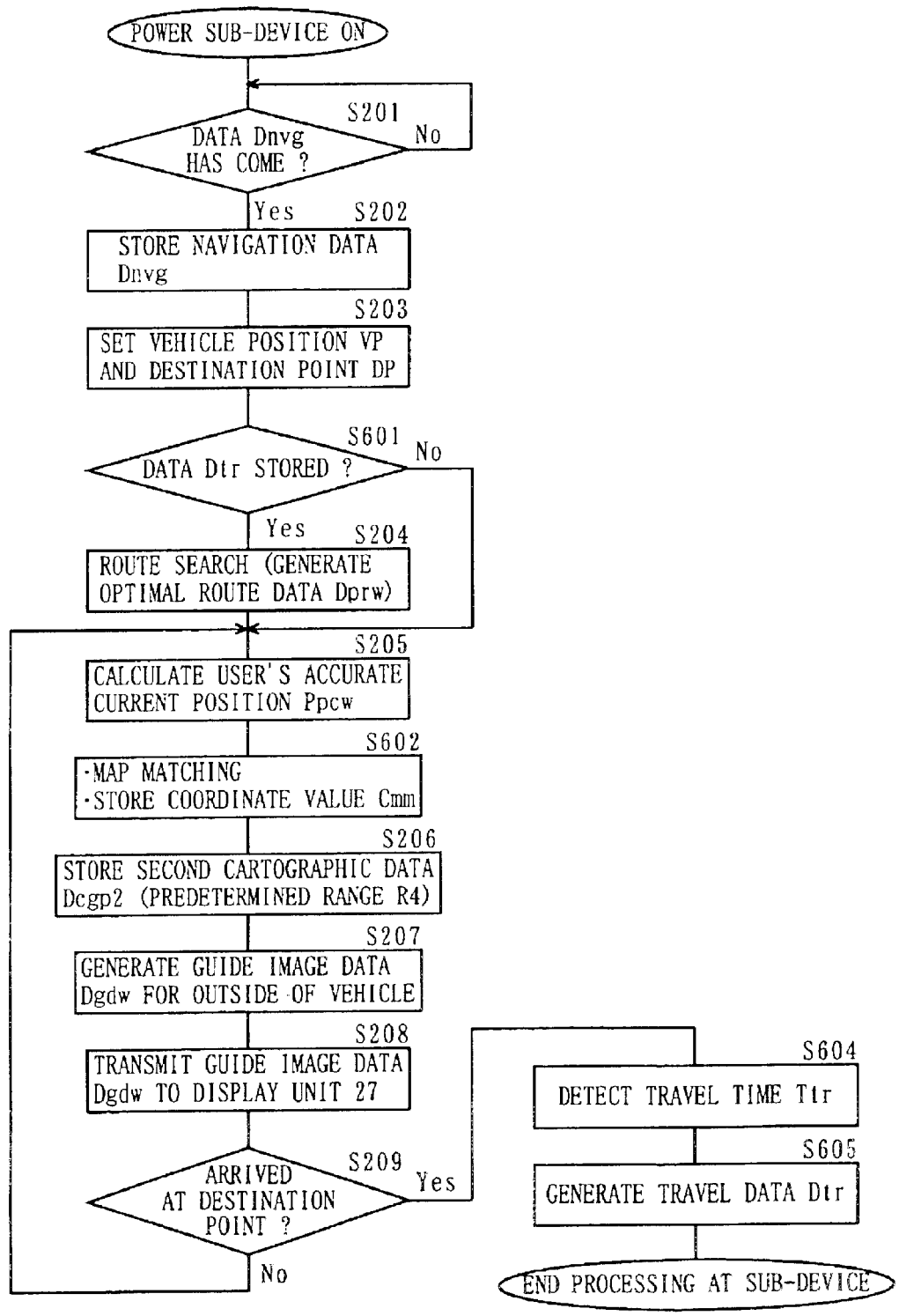
FIG. 24 is a flowchart showing the procedure carried out by a processor 21 of FIG. 23.

The program memory 81 previously stores a computer program (hereinafter simply referred to as program) PG6 executed by the processor 21. With reference to FIG. 24, described next is the procedure required for the off-vehicle navigation carried out by the sub-device 8 of FIG. 23. The flowchart of FIG. 24 is similar to that of FIG. 8, but different therefrom in that steps S601 to S604 are further provided. Therefore, steps in FIG. 24 corresponding to those in FIG. 8 are provided with the same step number, and are not described herein. The processor 21 of the sub-device 8 determines, in the next step of step S203, whether travel data Dtr containing the vehicle position VP and the destination point DP that coincide with those contained in the navigation data Dnvg received this time has been stored in the non-volatile storage unit 82 (step S601). If such travel data Dtr has not been stored, the processor 21 carries out steps S204 and thereafter. If such travel data Dtr has been stored, the processor 21 carries out step S602, which is described later.

Figure 25:
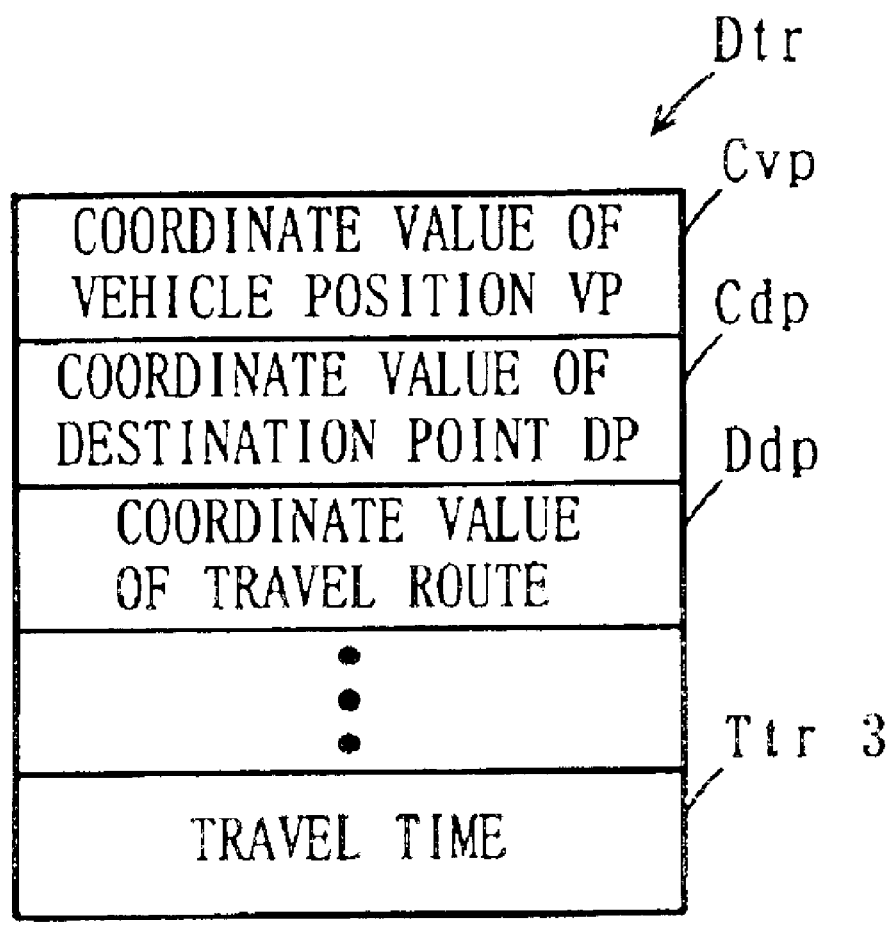
FIG. 25 is a schematic illustration showing the structure of travel data Drt generated in step S605 of FIG. 24.

Also, next to the step S205, the processor 21 carries out map matching for correcting the calculated current position Ppcw to longitude and latitude coordinates on a road of the map covering the predetermined range R4 stored in the working area 23, and stores a combination of these coordinates as a coordinate value Cmm in the working area 23 (step S603). With the above step S601 added, if it is determined in step S209 that the user has arrived at the destination point, the working area 23 has a plurality of combination of these coordinates Cmm stored therein. After the user arrives at the destination point, the processor 21 detects a travel time Ttr taken by the user to travel from the vehicle position VP to the destination point DP (step S604). The processor 21 then generates travel data Dtr as illustrated in FIG. 25, containing the coordinate value Cvp of the vehicle position VP, the coordinate value Cdp of the destination point DP, all of the coordinate values Cmm currently stored in the working area 23, and the travel time Ttr detected in step S604, and then stores the generated travel data Dtr in the non-volatile storage unit 82 (step S605). Here, each coordinate value Cmm represents a path traveled by the user going from the vehicle position VP to the destination point DP.

Here, if it is determined in step S601 that the travel data Dtr has been stored in the non-volatile storage unit 82, the user has once traveled via the vehicle position VP contained in the navigation data Dnvg to the destination point DP. In this case, the travel data Dtr contains the coordinate value Cmm indicating the path previously traveled. Therefore, the processor 21 does not have to generate the optimal route data Dprw in step S204, thereby jumping from step S601 directly to step S205. In this case, note that the guide image data Dgdw generated in step S207 is based on the coordinate value Cvp of the vehicle position VP, the coordinate value Cdp of the destination point DP, and each coordinate value Cmm stored in the non-volatile storage unit 82, in place of the optimal route data Dprw. Also, in step S207, the processor 21 may overlay the travel time Ttr contained in the travel data Dtr on the map represented by the guide image data Dgdw, or may calculate the remaining time assumed to be required for arriving at the destination point DP and overlay the calculated remaining time on the map.

Note that, in the above example modification, the travel data Dtr may be stored in a non-volatile storage unit provided to the main device 1 or 7.

Also, a scheme other than that described in step S1010 of FIG. 6, step S3030 of FIG. 16, and step S509 of FIG. 22 may be taken for determining whether the user is going to get off the vehicle. In an example scheme, it is detected whether the sub-device 2 (6) has been removed from the holder 4 and, based on the detection result, the processor 11 determines whether the user is going to get off.

Furthermore, in the above first, second, and third embodiments, the main device 1 and the sub-device 2; the main device 5 and the sub-device 6; and the main device 7 and the sub-device 2 are connected to each other via the cable 3. This is not restrictive, and both may be coupled to each other so as to wirelessly communicate with each other.

Still further, in the first and third embodiments, the storage device 14 of the main devices 1 and 7 has the second cartographic data Dcgp2 and the second road network data Dntw2 stored therein, and both data are transmitted to the sub-device 2 as part of the navigation data Dnvg. This is to reduce the sub-device 2 in weight and size. Alternatively, the sub-device 2 may include a storage unit for storing the second cartographic data Dcgp2 and the second road network data Dntw2. In the off-vehicle navigation, the sub-device 2 reads the second cartographic data Dcgp2 and the second road network data Dntw2 from the storage unit for use. In this case, the navigation data Dnvg to be transmitted to the sub-device 2 does not have to contain the second cartographic data Dcgp2 and the second road network data Dntw2.

Still further, in the first and third embodiments, the processor 11 uses the first cartographic data Dcgp1 and the first road network data Dntw1 read from the database DB1 stored in the storage unit 14 for generating the guide image data Dgdv for vehicle. In recent years, as well known, such a distribution technology has become available in recent years as that the first cartographic data Dcgp1 and the first road network data Dntw1 are distributed to the navigation systems NS1 and NS3 from servers remote therefrom. This distribution technology may be applied to the navigation system NS1 and NS3. That is, the processor 11 may use the first cartographic data Dcgp1 and the first road network data Dntw1 received from a remote server to generate the guide image data Dgdv for vehicle. Therefore, the storage unit 14 is not necessarily a component requisite to the main device 1 and 7. The same goes for the second embodiment, that is, the storage unit 52 is not necessarily a component requisite to the main device 5.

Still further, in the first and third embodiments, the processor 11 transmits the second cartographic data Dcgp2 and the second road network data Dntw2 to the communications controller 24 via the communications controller 110 and the cable 4, as illustrated in FIG. 10. The processor 21 uses the second cartographic data Dcgp2 and the second road network data Dntw2 received from the communications controller 110 to generate the guide image data Dgdw for outside of the vehicle. Alternatively, by applying the above distribution technology, the processor 21 can receive, from a remote server, the second cartographic data Dcgp2 and the second road network data Dntw2 including both of the vehicle position VP and the destination point DP, as long as the coordinate value Cvp of the vehicle position VP and the coordinate value Cdp of the destination point DP are known. Thus, in the first and third embodiments, the navigation data Dnvg may include at least information for specifying the vehicle position VP (intermediate point IP) and the destination point DP. Similarly, in the second embodiment, the navigation data Dnvg may include at least information for specifying the destination point DP.

Still further, in the first and third embodiments, the processor 11 transmits the coordinate value Cvp of the vehicle position VP to the communications controller 24 via the communications controller 110 and the cable 4, as illustrated in FIG. 10. However, by using the autonomous navigation sensors 25 and the receiver 26, the sub-device 2 can detect the coordinate value Cvp of the vehicle point VP. Therefore, the navigation data Dnvg may not contain the coordinate value Cvp of the vehicle point VP.

Still further, in the first and third embodiments, the user may go back to the vehicle after he or she performs some activities at the destination point. Therefore, it is preferable that the sub-device 2 set the starting point SP as a new destination point and the destination point DP as a new starting point, automatically search for a route from the new starting point to the new destination point, and then guide the user to the position of the vehicle according to the found route.

Still further, the programs PG1 to PG6 described in the above embodiments may be distributed as being recorded in a recording medium typified by CD-ROM, or via a communications network typified by the Internet.

Still further, the above described navigation system NS1 is constructed by the main device 1 and the sub-device 2 in the above embodiment. Alternatively, the main device 1 and the sub-device 2 may not be components of the system, but may be provided separately from the system. Similarly, the main device 5 and the sub-device 6, and the main device 7 may be provided separately from the system.

While the invention has been described in detail, the foregoing description is in all aspects illustrative and not restrictive. It is understood that numerous other modifications and variations can be devised without departing from the scope of the invention.

What is claimed is:

1. A navigation system for guiding a user from a starting point to a destination point, said navigation system comprising:
   a main device to be fixed to a vehicle; and
   a sub-device operable to communicate with said main device, said sub-device being portable by the user, wherein
   said main device comprises:
      a receiving unit for receiving at least information about the destination point;
      a first generating unit for generating vehicle guide image data for the vehicle representing a guide image for guiding the vehicle;
      a first displaying unit for displaying the guide image represented by the vehicle guide image data generated by said first generating unit;
      an input unit for generating, in response to an operation by the user, a signal indicative of timing when the user gets off the vehicle;
      a determining unit for determining whether the user gets off the vehicle, said determining unit determining that the user gets off the vehicle when the signal is received; and
      a generating/transferring unit for generating, when said determining unit determines that the user gets off the vehicle, navigation data including at least the destination point received by said receiving unit, and transferring the navigation data to said sub-device, and
   said sub-device comprises:
      a second generating unit for generating guide image data for outside of the vehicle representing a guide image for guiding the user traveling outside of the vehicle based on the navigation data transferred from said generating/transferring unit; and
      a second display unit for displaying the guide image represented by the guide image data for outside of the vehicle generated by said second generating unit.

2. The navigation system according to claim 1, wherein said main device further comprises a calculating unit for calculating a current position of the vehicle,
   said generating/transferring unit generates the navigation data further including, as a vehicle position, the current position of the vehicle calculated by said calculating unit when said determining unit determines that the user gets off the vehicle, and transfers the navigation data to said sub-device,
   said sub-device further comprises a route searching unit for deriving an optimal route from the vehicle position to the destination point based on the navigation data transferred from said generating/transferring unit, and
   said second generating unit further generates guide image data for outside of the vehicle by using the optimal route derived by said route searching unit.

3. A navigation system according to claim 2, wherein said route searching unit further derives an optimal route from the destination point to the vehicle position.

4. A navigation system for guiding a user from a starting point to a destination point, said navigation system comprising:
   a main device to be fixed to a vehicle; and
   a sub-device operable to communicate with said main device, said sub-device being portable by the user, wherein
   said main device comprises:
      a receiving unit for receiving at least information about the destination point;
      a first generating unit for generating vehicle guide image data for the vehicle representing a guide image for guiding the vehicle;
      a first displaying unit for displaying the guide image represented by the vehicle guide image data generated by said first generating unit;
      a generating/transferring unit for generating, when a determining unit determines that the user gets off the vehicle, navigation data including at least the destination point received by said receiving unit, and transferring the navigation data to said sub-device;
      a storage unit for storing possible place data including a possible place as the destination point and an intermediate point through which the user goes to reach the destination point;
      an extracting unit for extracting, from the possible place data stored in said storage unit, the intermediate point related to the destination point received by said receiving unit;

a calculating unit for calculating a current position of the vehicle; and said determining unit for determining whether the user gets off the vehicle, said determining unit determining that the user gets off the vehicle when the current position calculated by said calculating unit coincides with the intermediate point extracted by said extracting unit, and said sub-device comprises:

a second generating unit for generating guide image data for outside of the vehicle representing a guide image for guiding the user traveling outside of the vehicle based on the navigation data transferred from said generating/transferring unit; and a second display unit for displaying the guide image represented by the guide image data for outside of the vehicle generated by said second generating unit.

5. The navigation system according to claim 4, wherein said storage unit further stores cartographic data representing a map that depicts an optimal route from the intermediate point to the destination point included in the possible place data, said generating/transferring unit generates the navigation data further including the cartographic data stored in said storage unit when said determining unit determines that the user gets off the vehicle, and transfers the navigation data to said sub-device, and said second generating unit generates the guide image data for outside of the vehicle based on the cartographic data included in the navigation data transferred from said generating/transferring unit.

6. A navigation system for guiding a user from a starting point to a destination point, said navigation system comprising:

a main device to be fixed to a vehicle; and a sub-device operable to communicate with said main device, said sub-device being portable by the user, wherein said main device comprises:

a calculating unit for calculating a current position of the vehicle;

a receiving unit for receiving at least information about the destination point and an intermediate point through which the user goes to reach the destination point;

a first generating unit for generating vehicle guide image data for the vehicle representing a guide image for guiding the vehicle;

a first displaying unit for displaying the guide image represented by the vehicle guide image data generated by said first generating unit;

a determining unit for determining whether the user gets off the vehicle, said determining unit determining that the user gets off the vehicle when the current position calculated by said calculating unit coincides with the intermediate point received by said receiving unit; and a generating/transferring unit for generating, when said determining unit determines that the user gets off the vehicle, navigation data including at least the destination point received by said receiving unit, and transferring the navigation data to said sub-device, and said sub-device comprises:

a second generating unit for generating guide image data for outside of the vehicle representing a guide image for guiding the user traveling outside of the vehicle based on the navigation data transferred from said generating/transferring unit; and a second display unit for displaying the guide image represented by the guide image data for outside of the vehicle generated by said second generating unit.

7. The navigation system according to claim 6, wherein when said determining unit determines that the user gets off the vehicle, said generating/transferring unit generates the navigation data that further includes, as a vehicle position, the current position calculated by said calculating unit, and transfers the navigation data to said sub-device, said sub-device further includes a route searching unit for deriving an optimal route from the vehicle position to the destination point based on the navigation data transferred from said generating/transferring unit, and said second generating unit generates the guide image data for outside of the vehicle by using the optimal route derived by said route searching unit.

8. The navigation system according to claim 2, wherein said sub-device further includes:

a calculating unit for calculating a current position of the user who travels outside of the vehicle; and a non-volatile storage unit for storing, as travel data, one or more of the current positions calculated by said calculating unit while the user traveling outside of the vehicle is guided to the destination point, and when the travel data is stored in said non-volatile storage unit, said second generating unit generates the guide image data for outside of the vehicle by using the travel data stored in said non-volatile storage unit.

9. A method for use in a navigation system for guiding a user from a starting point to a destination point, the navigation system including a main device to be fixed to a vehicle and a sub-device capable of communicating with the main device, the sub-device being portable by a user, said method comprising:

a receiving operation of receiving at least information about the destination point;

a first generating operation of generating vehicle guide image data representing a guide image for guiding the vehicle;

a first transmitting operation of transmitting the vehicle guide image data generated in said first generating operation to a first display unit included in the main device for displaying the guide image represented by the vehicle guide image data;

a signal generating operation of generating, in response to an operation by the user, a signal indicative of timing when the user gets off the vehicle;

a determining operation of determining whether the user gets off the vehicle, said determining operation determining that the user gets off the vehicle when the signal from said signal generating operation is received;

a generating/transferring operation of generating, when determined in said determining operation that the user gets off the vehicle, navigation data at least including the destination point received in said receiving operation, and transferring the navigation data to the sub-device;

a second generating operation of generating guide image data for outside of the vehicle that represents a guide image for guiding the user traveling outside of the vehicle to the destination point based on the navigation data transferred from the main device; and a second transmitting operation of transmitting the guide image data for outside of the vehicle generated in said second generating operation to a second display unit included in the sub-device for displaying the guide image represented by the guide image data for outside of the vehicle, wherein said receiving operation, said first generating operation, said first transmitting operation, said signal generating operation, said determining operation, and said generating/transferring operation are executed by the main device, and said second generating operation and said second transmitting operation are executed by the sub-device.

10. The method according to claim 9, further comprising:

a calculating operation, executed by the main device, of calculating a current position of the vehicle; and a route searching operation, executed by the sub-device, of deriving an optimal route from the vehicle position to the destination point based on the navigation data transmitted from the main device, wherein in said generating/transferring operation, when it is determined in said determining operation that the user gets off the vehicle, generating and transferring the navigation data further including the current position calculated in said calculating operation as a vehicle position to the sub-device, and in said second generating operation, by using the optimal route derived in said route searching operation, the guide image data for outside of the vehicle is generated.

11. A method for use in a navigation system for guiding a user from a starting point to a destination point, the navigation system including a main device to be fixed to a vehicle and a sub-device capable of communicating with the main device, the sub-device being portable by a user, said method comprising:

a receiving operation of receiving at least information about the destination point;

a first generating operation of generating vehicle guide image data representing a guide image for guiding the vehicle;

a first transmitting operation of transmitting the vehicle guide image data generated in said first generating operation to a first display unit included in the main device for displaying the guide image represented by the vehicle guide image data;

a storing operation for storing possible place data including a possible place as the destination point and an intermediate point through which the user goes to reach the destination point;

an extracting operation for extracting, from the possible place data, the intermediate point related to the destination point received in said receiving operation; and a calculating operation for calculating a current position of the vehicle;

a determining operation of determining whether the user gets off the vehicle, said determining operation determining that the user gets off the vehicle when the current position calculated in said calculating operation coincides with the intermediate point extracted in said extracting operation;

a generating/transferring operation of generating, when determined in said determining operation that the user gets off the vehicle, navigation data at least including the destination point received in said receiving operation, and transferring the navigation data to the sub-device;

a second generating operation of generating guide image data for outside of the vehicle that represents a guide image for guiding the user traveling outside of the vehicle to the destination point based on the navigation data transferred from the main device; and a second transmitting operation of transmitting the guide image data for outside of the vehicle generated in said second generating operation to a second display unit included in the sub-device for displaying the guide image represented by the guide image data for outside of the vehicle, wherein said receiving operation, said first generating operation, said first transmitting operation, said storing operation, said extracting operation, said calculating operation, said determining operation, and said generating/transferring operation are executed by the main device, and said second generating operation and said second transmitting operation are executed by the sub-device.

12. The method according to claim 11, wherein said storing operation further comprises storing cartographic data representing a map that depicts an optimal route from the intermediate point to the destination point included in the possible place data, in said generating/transferring operation, when it is determined in said determining operation that the user gets off the vehicle, generating and transferring the navigation data further including the cartographic data to the sub-device, and in said second generating operation, generating guide image data for outside of the vehicle based on the cartographic data included in the navigation data transferred from the main device.

13. A method for use in a navigation system for guiding a user from a starting point to a destination point, the navigation system including a main device to be fixed to a vehicle and a sub-device capable of communicating with the main device, the sub-device being portable by a user, said method comprising:

a calculating operation of calculating a current position of the vehicle;

a receiving operation of receiving at least information about the destination point and an intermediate point through which the user goes to reach the destination point;

a first generating operation of generating vehicle guide image data representing a guide image for guiding the vehicle;

a first transmitting operation of transmitting the vehicle guide image data generated in said first generating operation to a first display unit included in the main device for displaying the guide image represented by the vehicle guide image data;

a determining operation of determining whether the user gets off the vehicle, said determining operation determining that the user gets off the vehicle when the current position calculated in said calculating operation coincides with the intermediate point received in said receiving operation;

a generating/transferring operation of generating, when determined in said determining operation that the user gets off the vehicle, navigation data at least including the destination point received in said receiving operation, and transferring the navigation data to the sub-device;

a second generating operation of generating guide image data for outside of the vehicle that represents a guide image for guiding the user traveling outside of the vehicle to the destination point based on the navigation data transferred from the main device; and a second transmitting operation of transmitting the guide image data for outside of the vehicle generated in said second generating operation to a second display unit included in the sub-device for displaying the guide image represented by the guide image data for outside of the vehicle, wherein said calculating operation, said receiving operation, said first generating operation, said first transmitting operation, said determining operation, and said generating/transferring operation are executed by the main device, and said second generating operation and said second transmitting operation are executed by the sub-device.

14. The method according to claim 13, further comprising a route searching operation of deriving an optimal route from the vehicle position to the destination point based on the navigation data transferred from the main device, wherein in said generating/transferring operation, when it is determined in said determining operation that the user gets off the vehicle, generating and transferring the navigation data further including the current position calculated in said calculating operation as a vehicle position to the sub-device, and in said second generating operation, by using the optimal route derived in said route searching operation, generating the guide image data for outside of the vehicle.

15. A computer program for guiding the user from a starting point to a destination point used in a computer readable medium in a navigation system comprising a main device to be fixed to a vehicle and a sub-device capable of communicating with the main device, the sub-device being portable by the user, said computer program comprising:

a receiving operation of receiving at least information about the destination point;

a first generating operation of generating vehicle guide image data representing a guide image for guiding the vehicle;

a first display operation of displaying the guide image represented by the vehicle guide image data generated by said first generating operation; and a first transmitting operation of transmitting the vehicle guide image data generated in said first generating operation to a first display unit included in the main device for displaying the guide image represented by the guide image data for the vehicle, wherein the main device generates, in response to an operation by the user, a signal indicative of a timing when the user get off the vehicle, said computer program further comprising:

a determining operation of determining whether the user gets off the vehicle, said determining operation determining that the user gets off the vehicle when the signal is received;

a generating/transferring operation of generating, when determined in the determining operation that the user gets off the vehicle, navigation data at least including the destination point received in said receiving operation, and transferring the navigation data to the sub-device;

a routing operation of deriving an optimal off-vehicular route from a position of the vehicle to the destination point using the navigation data received from the main device by said receiving operation;

a second generating operation of generating guide image data of the derived optimal off-vehicular route that represents a guide image for guiding the user traveling outside of the vehicle to the destination point; and a second transmitting operation of transmitting the guide image data generated in said second generating operation to a second display unit included in the sub-device for displaying the guide image represented by the guide image data, wherein said receiving operation, said first generating operation, the first transmitting operation, the determining operation, and said generating/transferring operation are executed by the main device, and said routing operation, said second generating operation said second transmitting operation are executed by the sub-device.

* * * * *